United States Patent

Hörl et al.

[11] Patent Number: 5,215,692
[45] Date of Patent: Jun. 1, 1993

[54] PROCESS FOR THE SURFACE GRAFTING OF FORMED BODIES, IN PARTICULATE ALSO MICROPOROUS MEMBRANES MADE FROM NITROGEN-CONTAINING POLYMERS

[75] Inventors: Hans-Heinrich Hörl, Bovenden; Dietmar Nussbaumer; Eberhard Wünn, both of Göttingen, all of Fed. Rep. of Germany

[73] Assignee: Sartorius AG, Göttingen, Fed. Rep. of Germany

[21] Appl. No.: 829,024

[22] PCT Filed: Sep. 6, 1990

[86] PCT No.: PCT/EP90/01498
§ 371 Date: May 1, 1992
§ 102(e) Date: May 1, 1992

[87] PCT Pub. No.: WO91/03310
PCT Pub. Date: Mar. 21, 1991

[30] Foreign Application Priority Data
Sep. 6, 1989 [DE] Fed. Rep. of Germany ....... 3929648

[51] Int. Cl.⁵ ............................................. E01D 71/56

[52] U.S. Cl. .................................. 264/48; 210/639; 210/500.37; 264/DIG. 48; 264/DIG. 62; 427/244

[58] Field of Search .......... 264/41, 45.1, 48, DIG. 48, 264/DIG. 62; 427/244; 210/639, 500.37, 500.38, 500.39, 654; 428/420, 423.1, 422.8, 423.5, 424.7, 435, 441, 442, 473.5, 474.4, 474.7, 474.9, 475.5

[56] References Cited
U.S. PATENT DOCUMENTS
4,277,344  7/1981  Cadotte ............................ 210/654

Primary Examiner—Frank Sever
Attorney, Agent, or Firm—Eric P. Schellin

[57] ABSTRACT

Halogen-substitutable hydrogen atoms are linked to nitrogen atoms of a polymer, with ethylenically-unsaturated monomers. By using inorganic or organic hypohalogenites and/or organic N-halogen derivatives as halogenation means, hydrogen atoms on the nitrogen atoms of the polymer membranes or polymer formed materials are replaced by halogen atoms and part of these are removed by reducing agents in the presence of ethylenically unsaturated monomers, with radical grafting of these on to the nitrogen atoms, after which the remaining halogen atoms are removed by reducing agents in the absence of monomers.

45 Claims, 9 Drawing Sheets

Influence of the redox potential (mV) on the grafting
HOCl chlorination // 10% HEMA & dithionite Influence of the chlorination on the grafting of 10 % HEMA with dithionite (E=-340 mV)

Influence of the chlorination on the grafting of 10 % HEMA with dithionite (E=-340 mV)

Influence of the chlorination on the grafting of 10 % HEMA with dithionite (E=-340 mV)

PROCESS FOR THE SURFACE GRAFTING OF FORMED BODIES, IN PARTICULATE ALSO MICROPOROUS MEMBRANES MADE FROM NITROGEN-CONTAINING POLYMERS

The invention relates to a process for the surface grafting of formed bodies, in particular also microporous membranes made from nitrogen-containing polymers.

State of the Art

According to a widespread grafting process, radical groups are introduced into the chain of the base polymer, e.g. by means of high-energy radiation, on which radical groups the grafting can take place by means of radical chain polymerization.

The generation of the activated, e.g. radical groups which effect the starting point of the grafting takes place in these grafting processes in an untargeted fashion, that is, the grafting does not take place exclusively, on a certain grouping of the chain of the base polymer, such as e.g. on the nitrogen atom, but rather on all positions of the polymer chain which can be activated by means of high-energy radiation, e.g. also on methylene groups. A more or less strong degradation of polymer chains takes place at the same time by means of high-energy radiation and a damaging of the mechanical strength of the base polymer occurs as a consequence of the lowering of the degree of polymerization occasioned therewith. Likewise undesired side reactions in radiation-induced grafting are cross-linking reactions, which result in an embrittlement of the material.

Other processes of graft copolymerization are based on activation under radical formation by means of strong oxidizing agents such as e.g. $Ce^{IV}$ salts. This process can only be used in the case of very low pH'es, namely below pH 2, because otherwise a hydrolytic precipitation of the $Ce^{IV}$ salt occurs. The use of this process in the case of the polymers intended for the process of the invention results in a hydrolytic damaging of these polymers and a diminution of the mechanical strength due to a reduction in the degree of polymerization can also be observed. In addition, no purposeful grafting for increasing the chemical resistance of the base polymer is possible even according to this process.

Other processes for graft polymerization are based on chain transfer in that a homopolymerization of the monomer is induced by a radical initiator in the presence of the base polymer to be grafted, for which high temperatures must generally be employed (70°-80° C.). The grafting takes place in this instance by means of interaction of the growing polymer radical with the base polymer. The grafting site can also not be influenced in a purposeful manner in this instance A further disadvantage of this grafting process resides in the fact that only a slight portion of the monomer used is consumed for the grafting whereas at the same time a considerable amount of homopolymer is produced The formation of homopolymer is undesired because this increases the amount of the required monomer, which adversely affects the economy of the process and, moreover, a specific method step for removing the homopolymer becomes necessary.

The previously named grafting processes have the fact in common that the grafting does not take place at any sharply defined position of the base polymer, especially not with preference on the nitrogen atom. The chemical nature of the corresponding bonds such as the peptide group and of the carbamic acid group is therefore not changed and a positive influence on the chemical stability of these bonds can therefore not take place.

It is also known that polyamides can be grafted with acrylamide or acrylonitrile in such a manner that in a first method step the hydrogen atoms on the nitrogen atoms are replaced by chlorine atoms. The halogen-substituted polyamides are then converted back into the initial polymer by means of hydrazine or iron-II-salts, during which time a radical transitional state of nitrogen appears. A radical chain polymerization on the nitrogen takes place in the presence of the named monomers as well as in the case of other redox-initiated polymerization processes. This reaction is described e.g. by K. V. Phung and R. C. Schulz in "Makromolekulare Chemie", 180, 1825 (1979). It was used in this paper to demonstrate the mentioned radical transitional state during the reduction.

Another paper which concerns grafting onto N-halogenated polyamides describes the initiation by means of metal carbonyls (C. H. Bamford, F. C. Duncan, R. J. W. Reynolds in "J. Poly. Sci." part C, pp. 419–432 (1968).

However, it is not economically possible with any of the known processes to carry out a surface grafting on form bodies of nitrogen-containing polymers while controlling the penetration depth and the grafting density.

Problem definition

The invention has the problem of creating a process for the purposeful changing of the surface properties of form bodies by means of surface grafting which is suitable both for the surface grafting of compact form bodies as well as for microporous or fibrous form bodies, in particular those in areal web form and which does not require auxiliary devices which are difficult to manage technically such as sources of high-energy radiation or the use of high temperatures.

The changes of the surface properties consist both in the increasing of the chemical resistance of the surface area, which should occur in every case, as well as in the influencing of other chemical and/or physical surface properties, especially of the wetting- and adsorption behavior without the disadvantages which occur in traditional grafting processes becoming active. These disadvantages are, explicitly expressed: Chain degradation and cross-linking reactions on the base polymer and/or a high amount of homopolymerizate as well as an unintended and/or uncontrollable progression of the grafting deep into the surface.

The invention therefore has the further problem of creating a process which makes it possible in the case of form bodies which are not very compact, especially microporous membranes with a surface/mass ratio in a range of up to 50 $m^2/g$, to carry out the grafting selectively over the entire polymer matrix or to limit it to the externally located chain areas of the base polymer.

Although it is generally less important in the case of compact form bodies whether, in addition to the pure surface grafting, a grafting of deeper layers of the base polymer also takes place, it is also a problem of the invention to regulate this penetration depth of the grafting even in the case of compact form bodies because this can be significant in special instances. This is e.g. the case if the base polymer is converted by means of the grafting over the entire chain length into a soluble graft copolymerizate, so that the grafted surface layer would be removed upon contact with an appropriate solvent.

To the extent that it is a problem of the invention to create a process for increasing the chemical stability of the base polymer, especially in the surface area of form bodies, an increase of the resistance to chain degradation by means of oxidative and hydrolytic degradation as well as by radiation damage is to be understood thereunder. In particular, the problem of the process of the invention consists in converting the most labile groupings in the main chain of the base polymers such as the peptide- or carbamic acid group in the surface area into a form which is less susceptible to chemical attack in order to avoid a chain degradation and the associated loss of the typical properties of the base polymer. A stabilization of the surface layer should also protect the non-stabilized areas of the base polymer located thereunder from chemical attack. As a result thereof, it is not necessary to stabilize the entire base polymer of the form body, so that its mechanical properties are not altered in this area. An essential part of the problem definition is the fact that the above-named stabilization effects are achieved without the use of stabilizers which can be extracted with solvent.

A further problem of the invention is a process for the production of composite bodies in which the form body used for grafting is provided on the surface with a layer of the graft polymer which is chemically connected to the form body and is essentially free of individual chains of the base polymer, so that the swelling properties of the layer of the graft polymer are exclusively determined by the type of the monomer used for the grafting and thus differ in a characteristic manner from those of the base polymer. In particular, graft polymers are to be understood thereunder which exhibit a high swelling capacity in aqueous media so that they are accessible, when they are provided with chemical groups which enable them to reversibly or irreversibly bond certain target substances, to these chemical groups for the particular target substances even in the interior of this layer. The target substances can be e.g. proteins, the groups capable of reversibly bonding can be ionic groups or affinity ligands. The groups capable of irreversibly bonding can be groups which can enter chemical bonds with amino- or sulfhydryl groups of proteins under mild conditions and are known in the state of the art. As a result of the fact that not only the surface but also the interior of the grafted polymer layer is accessible for the target substances, an especially high bonding capacity of the composite material should be achieved.

Whereas the areas of application for the abovenamed composite materials are in the area of the adsorptive separation of substances, a further problem definition of the invention concerns the textile sector. The goal in the production of the composite bodies is here to provide the formed bodies, especially textile fibers, with a grafted polymer layer which differs as regards the dyeing technology from the base polymer in the desired manner. An example for such an instance of application is present when the grafted-on polymer layer is to be dyed by means of a class of dyes for which the base polymer exhibits either no or only a slight affinity. This is especially desirable from the standpoint of textile technology when mixed fibers are to be dyed in one work step, e.g. mixed fibers of polyamides and cotton in a dye bath with reactive dyes for cellulose.

A further problem of the invention is to create a process for the purposeful changing of the wetting properties of form bodies, especially in the direction of an increase in the water wettability as well as the wettability by liquid with an even greater surface tension than that of water such as e.g. electrolytic solutions in high concentration. This goal is significant in all previously named areas of application. In addition to an increasing of the water wettability, there is also the problem of creating a process for the reduction of the adsorption capacity for lipophilic substances. In the case of microporous membranes primarily but not exclusively the protein adsorption should be reduced and in the case of textile fibers the contamination by fatty substances. In both cases a consequence of the reduction of the affinity for lipophilic substances is the fact that when such an adsorption has nevertheless taken place, it can be readily be undone again. In the case of textile fibers, this is expressed by the fact that washing can take place under considerably milder conditions than without such a modification of the surface. Likewise, filter membranes can be washed free again more easily after clogging by means of such a modification.

Another problem of the invention is to make possible a process for the influencing of the zeta potential either in the direction of a negative or of a positive potential. The zeta potential also has considerable influence both in the case of filter materials and in the case of textiles on the properties of use as it determines the contamination properties in accordance with the contacting media. The electrostatic charge of the form bodies is also closely associated with the zeta potential, which charge should also be reduced by the process of the invention in that the surface conductivity is increased by means of the introduction of ionic groups into the surface.

A further problem of the invention consists in the case of formed bodies which are not very compact and in the case of which the totality of the base polymer is located in a layer close to the surface in converting this form body entirely into a graft copolymer, during which an isotropic growth of this form body occurs with retention of its original form and the grafted form body differs in its chemical and optionally also mechanical properties and/or solubility properties in a desired manner from the initial product. In addition to a change in the chemical stability, these property changes can consist in an elevated as well as in a reduced solubility in certain solvents. As regards the mechanical properties, both an increase in the mechanical strength as well as an increase in flexibility can be achieved.

Solution of the problem

In order to regulate the penetration depth of the grafting reaction, it is of decisive importance that the conditions of halogenation and of reduction as well as the grafting time be monitored. It was determined that a high degree of chlorination before the grafting in conjunction with a weakly negative redox potential during the grafting in short grafting times counteracts a deep progression of the grafting.

The invention is accordingly based on the surprising determination that the higher the density of N-chlorinated nitrogen is, the stronger the limitation of the grafting on the external parts of the chains of the base polymer.

The mechanism by which the grafting is limited in the case of highly halogenated surfaces to a thinner surface layer than in the case of surfaces with low halogenation presently escapes scientific explanation. It is assumed, however, that a high density of halogenated nitrogen atoms inhibits the actual grafting process up to a certain degree. This assumption is based on the fact that the initial grafting speed in the case of low-halogenated surfaces is at first considerably higher than that of highly halogenated surfaces. The degrees of grafting of high- and low-halogenated surfaces do not become equal until during the course of a rather long grafting time. However, after this time the grafting in the case of the higher-halogenated surfaces continues and comes to a standstill much later than in the case of the low-halogenated surfaces.

It is concluded therefrom that the originally highly halogenated surface is first partially dehalogenated in an induction phase until the halogen density has been reduced to the degree at which no inhibition of the grafting takes place any more. This applies at first only to the outermost polymer chains whereas the chains located thereunder still exhibit a high alogen density and the deep grafting is at first still inhibited. The gradient of the halogen concentration is not recuded until during the course of the further grafting time and therewith of longer action of the reducing agent on the chains located further inside, so that the inhibiting halogen concentration is also dropped below for the latter. A consequence of this development is that the nature of the actual surface grafting is increasingly lost as the grafting time increases in favor of an inner grafting.

The fact that a less negative redox potential acts in the direction of a pure surface grafting is also in harmony with the explanation attempt since in the case of a less reducing medium the reduction of the halogen gradient takes place more slowly than under strongly reducing conditions.

For reasons which have also not been completely explained, a grafting in the membrane matrix also takes place if an exclusive but incomplete surface halogenation has taken place by means of the further essential measures of the invention to be discussed further below. A conceivable mechanism for this process could be based on the fact that the hypohalogenation or hypohalogenous acid in hydrolytic equilibrium in the aqueous medium with the nitrogen-halogenated polymer migrates into the interior of the matrix and results there primarily in a nitrogen halogenation. Another hypothesis is based on the fact that a halogen transfer takes place in the solid phase, that is, as a consequence of thermal oscillations of the chain segments, a halogen exchange takes place between halogenated and non-halogenated polymer chains.

The previous explanations refer primarily of the penetration depth of the grafting. The thickness of the grafted-on layer, which is essentially determined by the chain length and chain density of the grafted-on polymer, can be controlled by the selection of the monomer concentration and the grafting time. A high monomer concentration increases both the chain length and the chain density but on the other hand a long grafting time primarily increases the latter.

The special properties of the graft polymer are essentially determined by the selection of the particular monomer, which will be explained more extensively in the detailed description of the invention.

Type of form bodies

The type and use of form bodies are just as manifold as the areas of application of the polymers intended for the grafting of the invention. They can be compact bodies, which also includes those bodies which exhibit a surface which is relatively small in relation to their mass. Examples for this are plates, pipes, hoses, vessels such as bottles and the like as well as also construction components such as gears. Less compact form bodies, which exhibit a relatively large surface in relation to their mass, are foils, fibers or capillaries. Fibers in a thickness range of 1-100 μm have e.g. a surface/mass ratio approximately in a range of 0.4 to 4 $m^2/g$. Fibrous formed bodies can be processed further in the form of textile fibers to tissues and likewise to non-woven areal structures such as fleeces, which can be used e.g. for purposes of filtration.

The process of the invention is especially suitable for formed bodies which exhibit an extremely large ratio of surface to mass of the polymer such as e.g. for microporous membranes for particle- and sterile filtration whose base polymer frequently consists of polyamides or polysulfonamides. The surface/mass ratio can be in the case of such porous form bodies in a range between 5 and 50 $m^2/g$. The webs existing between the pores therefore exhibit only very slight wall thicknesses, with typical values being on the order of a few hundredths to a few tenths of a micron. Microporous membranes can be divided into ultra- and microfiltration membranes. The former are characterized by pore sizes which enable them to retain macromolecules approximately in a molar mass range between 500 and 1,000,0000 daltons whereas the latter exhibit active pore sizes in a range between approximately 0.01 and 10 μm. Microporous membranes exhibit either a continuously microporous structure or a microporous base structure and a skin-like layer located on the surface which layer is designated in the technical jargon as "skin". As a consequence of the lack of micropores, this skin does not exhibit a convective but rather only a diffuse permeability for the transport of substances and is therefore suited for separations of substances on a molecular basis. Typical industrial separating methods which can be carried out with the last-named mebranes comprising a skin are reverse osmosis, gas separation and pervaporation.

A further group of formed bodies with high surface-mass ratio are foams as well as microporous, vapor-permeable materials, which latter can be used as replacement material for leather. Polymers preferred in industry for the production of such formed bodies are the polyurethanes. Foams can be open-cell or closed-cell. In the first instance the invention provides for a grafting on the total, thus also on the inner surface of the foam and in the other instance only on the outer surface.

Type of polymers

Aliphatic polyamides such as nylon 4, nylon 6, nylon 6.6 and higher aliphatic polyamides as well as aromatic polyamides which are known e.g. under the trade name of Nomex and Kevlar can be used, for example, to produce such formed bodies. The repeating structural unit of the peptide bond is common to the polymer class of polyamides:

—CO—NH—

The peptide bond can occur alone or also in combination with other repeating structural units such as e.g. in combination with the sulfone group:

—SO$_2$—

Polymers with peptide groups and sulfone groups are known as polysulfonamides and can be produced by means of the polycondensation of diaminodiarylsulfones with aromatic dicarboxylic acid.

Another group of polymers consisting of those which can be produced for grafting form bodies used according to the method of the invention are the polyurethanes. The polyurethanes differ from the polyamides in that they exhibit the carbamic acid group

—O—CO—NH— instead of the peptide bond.

In distinction to the previously named polymers suitable for the process of the invention and containing nitrogen in the main chain, polymers containing the nitrogen in a side chain are also suitable. This can involve either primary or secondary amino groups:

—NH$_2$, —NHR but not tertiary amino groups. Likewise, the nitrogen-containing groups of the side chain can be primary or secondary amide groups:

—CO—NH$_2$, —CO—NHR

The polymers suitable for the application of the process of the invention have the fact in common that they have a hydrogen atom on the nitrogen which hydrogen atom can be substituted by a halogen atom, especially a chlorine or bromine atom.

The polymers provided for the invention display a number of advantages which have resulted in their being widely used in industry. Thus, many representatives of polyamides are characterized by a high mechanical strength and a high softening point whereas the polyurethanes exhibit very advantageous elastic properties. In contrast thereto, these polymers exhibit certain disadvantages for practical application which can be traced in part to the limited stability of the peptide- and the carbamic acid group. A degradation of these groups, e.g. by means of hydrolytic, oxidative or radiation-chemical influences results in disadvantageous changes in the properties, as a result of which the area of application of the formed bodies produced from these polymers is limited.

Type of monomers

Simply or multiply ethylenically unsaturated monomers are suitable for the application of the invention in as far as they exhibit a solubility, even if slight, in primarily aqueous systems. The term "primarily aqueous systems" denotes aqueous systems which contain, aside from the monomer, either no other organic component or a water-miscible solvent in a concentration which does not attain the quantity which results in a total precipitation of sodium dithionite. In the case of acetone as solvent, the amount can be e.g. up to 40 % by weight.

Among the group of simply ethylenically unsaturated monomers, the unsaturated carboxylic acids such as acrylic and methacrylic acid as well as their esters and amides are suitable; methacrylic acid esters and methacrylic acid amides are especially preferred representatives. The esters which can be used are in particular: Methylmethacrylate, ethylmethacrylate, hydroxyethylmethacrylate, hydroxypropylmethacrylate, dihydroxypropylmethacrylate as well as the corresponding acrylates. Further among the methacrylates: Glycidylmethacrylate, trimethylammonium-2-hydroxypropylmethacrylate, dimethylaminoethylmethacrylate, diethylaminoethylmethacrylate, diethylene glycolmethacrylate, octaethylene glycolmethacrylate, sulfopropylmethacrylate, 2-N-morpholinoethylmethacrylate. Suitable monomers with an amide base are: Acrylamide, dimethylaminopropylmethacrylamide, methacrylamidopropyltrimethylammonium chloride, 2-acrylamido-2-methyl-propane sulfonic acid, N-acrylamidoglycol sulfonic acid, N-morpholinopropylmethacrylamide, methacrylamidoglycolatemethyl ether, N-hydroxyethyl-methacrylamide, N-[tris(hydroxymethyl)]-methyl-methacrylamide. Further suitable, simply ethylenically unsaturated monomers are: Vinyl acetate, N-vinyl pyrrolidone, 4-vinyl pyridine, N-vinyl imidazol.

The named monomers can be used alone or in a mixture. In particular, it is possible to use simply and multiply ethylenically unsaturated monomers in combination, which achieves the grafting of a cross-linked polymer. However, multiply ethylenically unsaturated monomers can also be used alone.

Suitable multiply ethylenically unsaturated monomers are: Pentaerythritol dimethacrylate, glycerol dimethacrylate, tetraethyleneglycol dimethacrylate, tetraethyleneglycol diacrylate.

Graft polymerization

The term "graft polymerization" denotes a polymerization in which a side chain is grafted onto a polymer chain of a uniform product, which side chain consists of one or several other monomers. The properties of the graft copolymerizate obtained such as e.g. solubility behavior, melting point, water absorption, wettability, mechanical properties, adsorption behavior, etc. deviate more or less sharply from those of the initial polymer as a function of the type and amount of the grafted monomer. The greater the amount ratio of the grafted polymer in relation to the base polymer, the stronger the properties of the former predominate.

In addition, the properties of the graft copolymerizate are influenced by the position at which the grafting takes place on the initial polymer.

Graft polymerizations can be carried out both in liquid phase, that is, in a melt or solution, and in a solid phase, at which time the base polymer must generally be in a swollen form in order to make possible the access of the monomer to the chains of the base polymer. The swelling can take place either by means of the monomer itself or by means of a further component which does not participate itself in the polymerization. The grafting progresses in this instance from the surface to the interior of the polymer. The case can occur thereby that the graft copolymer being produced is soluble in the grafting medium, which accelerates the progress of the grafting because the diffusion paths are not lengthened during the grafting.

Surface grafting

The term "surface grafting" in the sense of the invention signifies that the grafting is limited to the surface area of the form body. It is a special aspect of the invention that a controlled surface grafting is made possible by being able to control the depth of the grafting by means of special measures.

Although the grafting process of the invention is essentially a surface modification of the formed bodies with the penetration depth of the grafting limited to a few hundredths of a μm, preferably to a layer thickness of less than 0.1 μm, in the case of less compact form bodies, which therefore exhibit a very high ratio of surface to mass, so that practically the entire base polymer is located in the surface zone, the entire base polymer can be reacted during the grafting in the extreme case, so that after the application of the process of the invention the formed body consists in a uniform manner of the graft copolymerizate. This case is designated as matrix grafting in order to distinguish it from a pure surface grafting.

In a pure surface grafting only the parts of the chains of the base polymer located directly on the surface of the formed body are grafted, so that in those instances in which the graft copolymer being produced was converted during complete grafting into a graft copolymer soluble in the grafting medium, the non-grafted part of the polymer chain remains in the polymer structure, so that no separation of the graft copolymer from the surface of the form body is possible. Therefore, those monomers can also be used in a pure surface grafting which would result in the case of complete grafting in soluble products. In the case of a matrix grafting of formed bodies in which entire chains of the base polymer are grafted, the utility of the monomers is limited to those in the case of which even the graft copolymerizate being product is insoluble. This can be achieved, if required, by means of a cross-linking grafting under the addition of a multiple ethylenically unsaturated monomer if the monomer provided for an application does not fulfill this precondiition itself.

The matrix grafting of non-compact form bodies is then necessary if bulk properties such as e.g. elasticity of flexibility, the solubility properties or the resistance to gamma rays is to be altered. If, on the other hand, only the adsorption behavior and/or the wetting behavior are to be influenced and an alteration of the mechanical properties as well as of the solubility are to be avoided. It is on the other hand necessary to avoid a progression of the grafting deep into the polymer of the matrix.

In the case of the matrix grafting of non-compact formed bodies, the result of the surface grafting is thus the same as that which would have been obtained if the particular formed body had been produced from the start from the graft copolymer. The advantage of subsequent grafting, in contrast thereto, resides in that fact that appropriate production methods are frequently known or possible for the base polymers whereas they are either unknown or cannot be carried out in principle for the graft copolymer. Thus, for example, suitable processes for producing microporous membranes of polyamides or polysulfonamides as well as for producing open-pore foams of polyurethanes are known. However, these techniques can not be applied straight away to the corresponding graft copolymerizates. If the graft copolymerizates are products which are insoluble in common solvents, these processes can even not be transferred in principle.

On the other hand, there are instances in which a pure surface grafting, that is, a sharp delimitation between the largely unchanged base polymer and the grafted-on polymer is of decisive significance for the intended application of the grafted formed bodies. Such instances are especially present if the base polymer is to function as carrier for the polymer grafted on in a thick layer and if this grafted-on layer should be largely free of chains of the base polymer.

An important example for such an instance is present if a composite material is to be produced for adsorptive separations of substances such as e.g. ion exchange or affinity chromatography by means of surface grafting onto microporous membranes. It is not only important thereby in the interest of a high adsorption capacity that the entire inner and outer surface is coated by a layer of the grafted-on polymer but also that this layer exhibits a certain thickness because the entire layer thickness of the grafted-on polymer contributes to the adsorption capacity.

It is necessary in the case of such membranes for the adsorptive separation of substances that the substances to be adsorbed, e.g. proteins, can penetrate into the grafted-on polymer layer. Although it can not be rigorously proven, it is assumed that for this the grafted-on chains must be present in a state which can be completely solvated by the medium used and that chains of the base polymer which are occasionally present are detrimental to this goal.

The above explanation is based on the observation that given identical initial membranes, the same degree of grafting and affinity ligands introduced in the identical manner, considerably lower bonding capacities for the substances to be adsorbed are found if the grafting took place over the entire layer thickness than if the grafting was limited to the chain segments of the base polymer close to the surface.

A distinction between these two types of surface grafting, that is, between matrix grafting and pure surface grafting, is possible in the case of microporous membranes by means of a comparison of the flow-through characteristic and of the outer dimensions before and after the grafting in as far as the membranes used for the grafting are not reinforced, that is, not provided with a fleece or tissue as reinforcement material. If a matrix grafting takes place in this instance, an isotropic growth of the membrane matrix occurs, that is, macroscopically viewed, both a surface growth and a thickness growth occur.

Since the pores also grow proportionally along with an isotropic growth of the membrane matrix, the number of pores per surface area drops thereby but their size increases, so that on the whole an increase of the hydraulic permeability can be observed. The opposite occurs in the case of a pure surface grafting, that is, when the grafting is limited to the chain segments of the base polymer close to the surface. Since the membrane matrix itself does not change its dimensions thereby but rather only an additional layer is grafted on. the outer dimensions also remain constant and the grafted-on layer results in a pore constriction so that the hydraulic permeability of the membrane decreases.

Although a distinction between these two borderline limiting forms of surface grafting is also conceivable polychemically, the potential methods for this are relatively complicated and the above-named distinguishing criterion appears to suffice for the practical requirements of membrane modification. To be sure, it can be determined in a limiting fashion that the type of monomer used also has an influence thereby. If a monomer is involved whose homopolymer is soluble or sharply swellable in the medium used for the mentioned permeability measurements, then a decrease of permeability can be observed in every case, thus also in matrix grafting. It turned out in practice that during the grafting of hydroxyethylmethacrylate a graft polymer is produced which is sufficiently poorly swellable in water to make it possible to use the above distinguishing criteria with water as medium for determining the hydraulic permeability.

The above explanations are not to be misunderstood in the sense that an increase or decrease in permeability must obligatorily be measureable in the case of the two borderline forms of surface grafting. This merely involves qualitative distinguishing criteria between the two border forms of surface grafting which are only measurable in the case of correspondingly high degrees of grafting and are moreover dependent on the pore size of the initial membranes. Thus, the lowering of the hydraulic permeability at the same degree of grafting is all the greater the lower the pore size of the initial membrane is. It can be indicated as guiding principle that the named distinguishing criteria become measurable in the case of membranes with a nominal pore size of 0.2 $\mu$m at degrees of grafting of above 10% by weight.

Either a high or a low degree of grafting can be striven for both in matrix grafting and also in a pure surface grafting. Since the above distinguishing criteria can not be used in the case of low degrees of grafting, it has proven to be advantageous in these instances when working out the grafting conditions to work up the basic conditions at first at high degrees of grafting in order to assure the utility of the named distinguishing criteria and to subsequently adjust the desired degree of grafting under conditions which are otherwise the same at lower monomer concentration. A non-aqueous medium can also be used thereby if the monomer provided for the grafting results in products which are strongly water-swellable, so that the hydraulic permeability for water decreases in every case.

On the other hand, in those instances in which a relatively thick layer of graft polymer is necessary for the application of the product to be produced by grafting, as e.g. in the case of the production of membranes for the adsorptive separation of substances, a reduction of the hydraulic permeability is unavoidable. so that in order to assure a certain minimum degree of hydraulic permeability of the final product, a correspondingly coarse-pore initial membrane must be the starting point. The relation of initial porosity, degree of grafting, permeability and bonding capacity of the final product can be varied for optimization in the manner customary with experts in the art.

It must also be considered hereby that as the pore size increases, the inner surface of a microporous membrane increases, particularly sharply in the range up to a nominal pore size of 0.2 $\mu$m. If the protein adsorption of the non-modified membrane is taken as a measure of the inner surface, then the relative inner surface at 0.2 $\mu$m is only 0.75, with the inner surface of a 0.1 $\mu$m membrane set equal to 1. It drops at 0.45 $\mu$m to only 0.65, at 0.8 $\mu$m to 0.5 and is still 0.43 at 3.0 $\mu$m. Since the thickness of the grafted-on layer results by calculation from the grafted-on mass divided by the surface, given the identical degree of grafting, the layer thickness is thus considerably greater in the case of a coarse initial membrane than in the case of a finer initial membrane. However, in the interest of short diffusion paths in order to achieve favorable adsorption and desorption kinetics, short diffusion paths are generally to be preferred in membranes for adsorptive separations of substances. In other words, in addition to the magnitudes of bonding capacity and hydraulic permeability, the kinetic parameters must also be included in the optimization instructions sketched above for the grafting of membranes for the adsorptive separation of substances.

A general instruction for the production of optimum such products can not be given because this optimum can differ greatly, depending on the application. If the target substance is to be extracted from a very great volume of a very dilute solution, high hydraulic permeabilities in conjunction with a high adsorption speed are necessary. It is advantageous in this instance to select a fine-pore initial membrane in conjunction with a low degree of grafting. If, on the other hand, the target substance is present in a relatively high concentration, the bonding capacity becomes more sginificant in relation to the kinetic viewpoints and more coarse-pore membranes with a high degree of grafting are to be preferred.

If only an influencing of the zeta potential or of the wettability or a reduction of the non-specific adsorption is to be achieved by the surface grafting, that is, only the surface of the graft polymer but not its volume becomes active, a pure surface grafting in conjunction with the minimum degree of grafting necessary for a complete surface coating should be striven for.

THE HALOGENATING AGENTS

Figure 1:
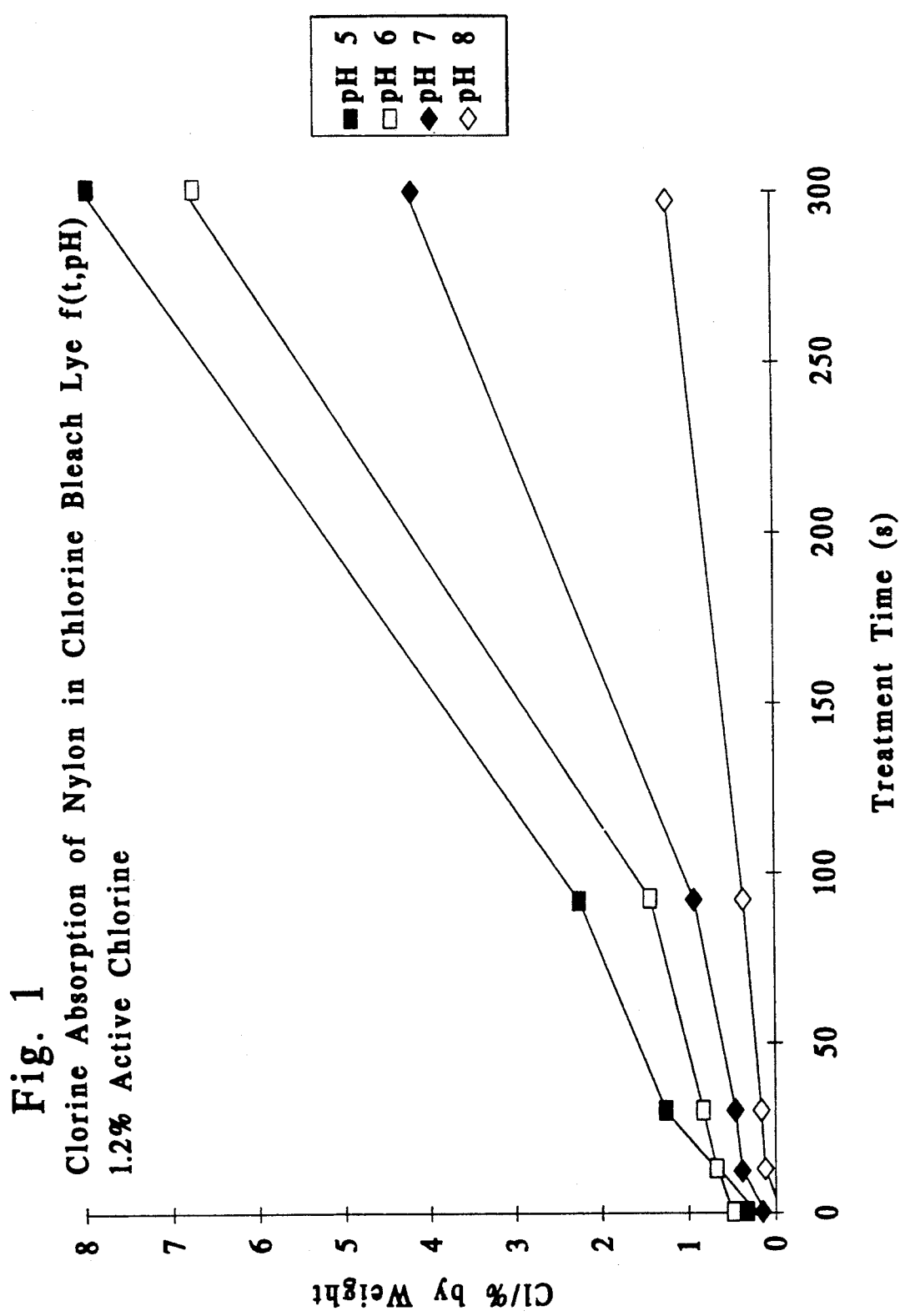
FIG. 1 is a graph showing treatment time for chlorine absorption of nylon in chlorine bleach lye.

Suitable halogenating agents are inorganic and organic chloro- and bromo compounds in which the halogen occurs with the oxidation number +1. Inorganic halogenating agents are hypochlorite- and hypobromination and the hypochlorous and hypobromous acid standing in equilibrium therewith in accordance with the pH used. t-butyl hypochlorite and organic N-chloro compounds, namely chloramine T and dichloroisocyanuric acid, can be named from among the organic chlorinating agents. The suitability of the halogenating agents for the process of the invention is discussed in the following in conjunction with the grafting of microporous membranes because this involves the most critical application and conclusions which result therefrom are obvious to the expert for other, more compact formed bodies.

When using inorganic and organic hypochlorites, it is possible, given an appropriately long exposure time, to quantitatively chlorinate e.g. nylon 6.6 membranes, that is, to achieve the theoretical chlorine content of N-Cl nylon of approximately 24 % by weight. In contrast thereto, the surface grafting of the invention takes place already at considerably lower chlorine contents, approximately on the order to 5–10 % of this value. A certain disadvantage of the high chlorine content necessary in the case of aqueous hypochlorite solutions for surface grafting is that on the one hand the damage to the membrane matrix due to oxidative side reactions, especially at pH'es 6, becomes all the higher, the higher the degree of chlorination selected, but on the other hand only a minute fraction of the chlorine introduced is consumed for the grafting. If the residual chlorine content remaining after the grafting is not completely removed again by a specific reduction step, it results upon storage of the material in a total desctrution of the membrane.

The chlorine excess for the surface grafting is therefore limited in an advantageous manner for carrying out the process of the invention to the absolute minimum degree, which succeeds by virtue of the fact that the chlorination is preferably carried out in aqueous medium with a water-soluble, organic nitrogen halogen derivative, especially a nitrogen chlorine derivative with high molar mass and as low a hydrolysis constant as possible. Typically, such nitrogen halogen derivatives are N-chloro derivatives of amides and sulfonamides like those described in "Ullmanns Encyclopädie der Technischen Chemie" [German—"Ullmanns Encyclopedia of Technical Chemistry"], 3d edition, vol. 5 on pages 382 to 388. A typical representative of this group of compounds is chloramine T, the sodium salt of N-chloro-p-toluene sulfonamide with a formula weight of 230 and a hydrolysis constant of approximately $10^{-8}$.

A high molar weight is therefore advantageous because this reduces the diffusion in the polymer matrix and the chlorination is limited to an area of the membrane matrix which is close to the surface. The low hydrolysis constant is significant because as a result thereof the concentration of the inorganic hypochlorite or of the hypochlorous acid present in the hydrolytic equilibrium is correspondingly low. However, the higher the concentration of hypochlorous acid, the more chlorine is also bound in the interior of the membrane matrix.

The course in time of the chlorination of membranes with chloramine T differs in a characteristic manner from that with aqueous hypochlorite. Whereas in the latter instance a constant rise of the chlorine content can be determined over a long time period until the theoretical content is achieved at total chlorination, it turns out in the case of chloramine T that even at a chlorination time on the order of one second approximately 50 % of the chlorine content achievable within 10 min. is absorbed. It was surprisingly determined in longer chlorination times that in the case of membranes chlorinated with chloramine T, even at these low chlorine contents the characteristics for a pure surface grafting were able to be determined which were not able to be achieved in the case of hypochlorite-chlorinated membranes until at magnitudes of higher chlorine contents.

It also turned out thereby, however, that very characteristic differences in the course of grafting occur in time as a function of the chlorine content and of the chlorination time. Whereas e.g. after a chlorination time of 5 seconds in aqueous chloramine T solution a total chlorine content in the membrane of 0.025 % is found, it is approximately 0.05 % at a chlorination time of 10 min. Nevertheless, the grafting speed, that is the weight increase during the grafting as a function of the time in the initial phase of the grafting, is considerably higher in the first instance, that is, at a low chlorine content, than it is in the second instance. The degree of grafting of the higher-chlorinated membranes is not considerably higher than that of the lower-chlorinated membranes until the grafting process has been extended over several hours. Thus, for example, the double chlorine content can result after 22 hours in a fivefold degree of grafting.

It is difficult to find an explanation for the dependency of the grafting kinetics on the degree of chlorination; however, the effects of the surface grafting are clear; as already mentioned, slight surface growth of non-reinforced membrane specimens as well as a great decline of the flowthrough performance function as a criterion for the surface grafting. It thus turns out that in the case of the low-chlorinated membranes a slight decline of the hydraulic permeability, if at all, and a large surface growth ca be determined from the beginning whereas in the case of the highly chlorinated membranes a strong reduction of flowthrough and a low surface growth occur at first in relation to the degree of grafting. After a certain period a minimum of the hydraulic permeability is achieved which corresponds in a typical instance to one third of the initial permeability. Thereafter, the permeability rises again, which is accompanied by a sudden increase of the surface growth.

This can be interpreted as follows: In the case of a low halogenation, especially chlorination with a nitrogen derivative such as chloramine T, a grafting in the matrix also occurs in addition to the surface grafting, whereas in the case of a high chlorine content (this is relative because in a chlorination with inorganic hypochlorite, chlorine contents which are 1 to 2 magnitudes greater are necessary to obtain this effect) the pure surface grafting occurs in the initial phase which, to be sure, is overlayed in the further course of grafting by the grafting in the matrix. The mechanism on which the use of nitrogen halogen derivatives with high molar mass and low hydrolysis constant as halogenating agent is based appears to be that these halogenating agents are only capable, due to their low diffusion coefficient in the polymer matrix, of halogenating a very thin surface layer of the polymer and this completely if the exposure time is selected to be long enough. The same effects occur thereby in this thin, highly halogenated layer as when the entire membrane matrix is highly halogenated with inorganic hypochlorites. However, since only a surface layer must be reduced thereby in the following, necessary reduction of the residual chlorine content, not only is this consequent step effected considerably more rapidly but only much less damaging of the membrane matrix can occur, if at all.

Among the conditions of chlorination, the pH of the chlorination bath is of primary importance. It can be stated in general that the damaging of the base polymer becomes greater as the pH rises, especially at values above 9. The chlorination speed also drops with rising pH. The preferred pH range is therefore between 5 and 7, with values around 6 being especially preferred. In the case of chloramine T, a value of 6.3 appears to be especially advantageous because the water solubility of the product decreases sharply thereunder. The preferred concentration range for chloramine T is between 0.1% and 3 % with values between 1 and 2 % being especially preferred.

The chlorination times with chloramine T can be between 1 sec. and 10 min. with the low times, preferably 2 to 10 sec, preferred if matrix grafting is intended. However, a low chlorination with inorqanic hypochlorites is generally to be preferred for matrix grafting. In order to achieve a pure surface grafting, the long chlorination times with chloramine T and appropriate other chlorinated organo nitrogen compounds with a high molar weight are preferred. Typical values can be between 0.5 and 10 min. and times between 1 and 5 min. are preferably used.

With inorganic hypochlorites, the preferred concentrations are approximately 0.05 to 3 % active chlorine with the range of 0.1–0.5 % being especially preferred. The chlorination times for effecting a matrix rafting are approximately 30 sec. to 5 min., preferably approximately 1 to 2 min. For effecting a pure surface grafting the chlorination with inorganic hypochlorites is less preferred; however, it is rendered possible at chlorination times between 5 and 15 min., preferably approximately 10 min.

The chlorination can also take place with organic hypochlorites in organic solvents such as e.g. t-butyl-hypochlorite with methylene chloride, hexane and other inert organic solvents; the type of solvent exerts a considerable influence thereby on the chlorination speed and the attainable chlorine content. It seems that those solvents which exhibit a swelling capacity or solvent power for the N-Cl derivative being produced such as e.g. chlorinated hydrocarbons and aromatic hydrocarbons result in higher chlorine contents. Inversely, the chlorination times must not be extended indefinitely when using these solvents because the material can otherwise go into solution. Aliphatic hydrocarbons, on the other hand, result in low chlorine contents and the conditions in this instance appear to be similar to those in the chlorination with chloramine T. However, this chlorination method is on the whole less preferred, not least of all because organic hypochlorites are relatively expensive and water-sensitive substances and no advantage over e.g. chloramine T can be seen.

Organic hypobromites can also be used as an alternative to chlorination with inorganic hypochlorites. In a special process variant the hypobromite can be produced in situ by exposing the formed body to be brominated successively to an atmosphere of bromine and one of ammonia. After the immediate brown coloration as a consequence of the adsorption of elementary bromine from the gas phase, a just as spontaneous discoloration with formation of hypobromite takes place in the atmosphere of ammonia. This process is preferred in process variants if a subsequent formation of homopolymerizate in the grafting bath is not problematic, because in this instance a subsequent soaking after the halogenation can be eliminated and the gas-phase process thus has the advantage that halogenation is performed without liquid media and the halogenated formed body can thus enter in a non-moistened state into the grafting medium.

The removal of the residual halogen content from the surface of the grafted formed body is possible in principle with a broad palette of reducing agents in takes place most rapidly with an aqueous soluton of sodium boron hydride, which is, however, not preferred for safety reasons on account of the development of hydrogen occurring thereby. Other suitable reducing agents are aqueous solutions of sodium hydrogen sulfite, hydrazine, iron-II-salts, rongalite at temperatures above 40° C., ascorbic acid at pH'es above 9 and sodium dithionite. The latter is the preferred reducing agent and is used in a pH range between 5 and 9, preferably approximately pH 6–7. The concentration can be 0.1–5% by weight with a range between 1 and 2 % being preferred.

The reducing agents

The preferred reducing agent for the application of the process of the invention is sodium dithionite as well as its related products such as e.g. rongalite. Other reducing agents such as hydrazine or ascorbic acid, the latter in the alkaline range, can also be used but are less preferred.

A reducing agent system which is suitable in accordance with the invention is described in the literature in conjunction with redox-initiated polymerizations (R. W. Brown, C. V. Bawn, E. B. Hansen, L. H. Howland in "Ind. Eng. Chem." 46, pp. 1073–1080 (1954) and consists of a combination of EDTA-complexed $Fe^{2+}$ with rongalite at approximately pH 10. Rongalite itself is largely ineffective at room temperature for the process of the invention but is effective at temperatures from 40°–50° C., at which it develops a sufficient redox potential. Rongalite, which is produced industrially as dithionite with formaldehyde, appears to be effective like dithionite itself in a quite similar manner and the addition of complexing Fe ions as well as the elevation of temperature essentially appears to bring about the release of dithionite.

When the process of the invention is used to influence the penetration depth of the grafting, not only the conditions of halogenation exert a considerable influence on the surface grafting, that is, the attainment of matrix grafting or of pure surface grafting, but also the reducing agent, its concentration, the pH and the redox potential in conjunction with the monomer do. Note in this regard that not only the redox potential is important, that is, it is not immaterial with which reducing agent a certain redox potential is adjusted or with which pH it is achieved in the case of a certain reducing agent but rather there is a dependency on each of these variables (which can not be specified as to range) which can, however, be determined by means of simple pretests.

The use of a strongly negative redox potential (high redox potential) generally tends to have the effect of favoring the matrix grafting whereas a low redox potential pushes back the amount of matrix grafting and thus favors the pure surface grafting. In order that a grafing occurs at all, a redox potential of at least approximately $-100$ mV is required in the case of sodium dithionite as reducing agent. The grafting speed at the start of the grafting increases with the redox potential up to approximately $-400$ mV. However, the higher the potential is, the smaller the final degree of grafting in the case of long grafting times (after several hours). The latter fact can probably be explained in that the probability of reduction without grafting increases at a high reduction potential.

Since the reaction speed also plays a large part in the technical execution of the process of the invention for the economy, the redox potential to be selected is an essential optimization criterion. Test series familiar to an expert in the art can determine how high a redox potential should be selected without a disturbing degree of matrix grafting occurring in the concrete instance. The potential is therefore advantageously selected to be as high as possible in this framework so that the work can be performed at as high a production speed as possible.

A pH range of 6–10 is preferred for carrying out the process of the invention using sodium dithionite as reducing agent, with the especially preferred range being between 7.5 and 8.5, namely approximately 8. The concentration of the sodium dithionite can be between 0.02 and 1%. The lower concentration ranges are preferred in those embodiments of the invention in which the matrix grafting should be prevented. If a grafting bath is used thereby for a fairly long time, the redox potential can be determined potentiometrically during the grafting and maintained constant by dosing in a sodium dithionite concentrate. Typical values for a suitable redox potential are between −100 and −700 mV, preferably between −100 and −500 mV, especially between −200 and −300 mV. The selection of a suitable redox potential can be determined by a few pretests. In addition, a constant pH is preferably maintained which can be achieved by means of an appropriately buffered grafting medium or likewise via the dosing in of lye.

Cause of the increased chemical resistance

In those instances in which the nitrogen atom is located in the main chain of the base polymer, as in the polyamides and polyurethanes, an oxidative splitting of the peptide- or carbamic acid group occurs upon the action of atmospheric oxygen under heat which splitting brings about a diminution of the chain length and therewith a degradation of the polymer. This reaction is accompanied by a loss of mechanical strength as well as an embrittlement. In addition,, a brown discoloration can occur, which is undesirable for many applications. In the same manner, a chain degradation also takes place in the case of a hydrolytic attack as well as upon the action of electromagnetic radiation, especially of UV and gamma radiation.

The elevation of the chemical resistance of the surface layer of the form bodies is surprisingly achieved by the invention in that the grafting of the monomer takes place in a purposeful manner on the nitrogen atom of the base polymer, so that the hydrogen atoms on the nitrogen are substituted entirely or partially by the grafted-on polymer chain. The N-substituted derivatives of the base polymer produced thus represent totally new classes of polymers in the case of polyamides and urethanes since they no longer exhibit the typical peptide or carbamic acid group but rather secondary amide groups or N-substituted carbamic acid groups in the main chain. As a consequence of the lack of a hydrogen atom on the nitrogen and/or of the steric hindrance brought about by the substitution and of the associated, reduced reactivity of these groups, the susceptibility to hydrolysis and oxidation typical for the initial polymers as well as the sensitivity to radiation are decisively reduced.

Oxidation resistance

The sensitivity to oxidation of the base polymers had the result that according to the state of the art a stabilization takes place by means of an addition of antioxidants if the form bodies produced therefrom are intended for use at rather high temperatures in the presence of atmospheric oxygen. However, it can be necessary even in such instances in which the use of the form bodies at high temperatures plays no part to treat them at high temperatures, e.g. in order to clean or sterilize them.

Sterilization at high temperatures plays a large part in the case of form bodies used in medicine or in the pharmaceutical or related industries. Frequently used sterilization methods are based e.g. on autoclaving or on vapor-blasting with water vapor up to above 140° C. Whereas the presence of residual atmospheric oxygen generally plays a lesser part during autoclaving, assuming appropriate operation of the autoclave, an exclusion of oxygen during vapor-blasting, especially in the initial phase, can not be assured.

The use of antioxidants has serious disadvantages, even though it is an effective measure for avoiding oxidative degradation. On the one hand the protection achieved with it is only temporary because the antioxidant is consumed by oxidation or can disappear in some other manner from the formed body. This occurs in particular during extraction by means of liquid media which are in contact with the formed body when it is being used. The removal of the antioxidant from the formed body can take place at high temperatures even via the gas phase (evaporation, sublimation) because relatively lower-molecular substances are involved without exception which exhibit a certain vapor pressure.

If the antioxidant is extracted by the medium in contact with the form body, there is not only a diminution or disappearance of the oxidation protection but also a contamination of the medium as a consequence. Substances with a very low water solubility can be involved thereby so that the existence of the extracted antioxidant in the medium can hardly be demonstrated. However, in the branches of industry which are potential candidates for using the form bodies such as e.g. the pharmaceutical or food industry, non-aqueous media such as e.g. those based on alcohols are also frequently used. It can be demonstrated that form bodies such as e.g. microporous membranes stabilized in a traditional manner by antioxidants exhibit no effective stabilization after treatment with ethanol, which can directly demonstrate the alcohol extractability of these antioxidants.

The contamination of the media with antioxidants, which are usually multiple substituted phenol derivatives, must also be designated as extremely undesirable if direct side effects of these substances which effects are toxic or dangerous in some other manner are unknown.

It is known that even substances with an extremely low water solubility are extracted from polymers by aqueous media if these aqueous media contain components which are capable of emulsification or of some other binding of lipoid-soluble substances. This is especially known in the case of softeners like those used in the processing various plastics. Typical aqueous media capable of extracting lipoid-soluble substances from polymers are protein solutions such as e.g. serum, blood plasma or solutions of serum proteins like those occurring in the fractionation of blood plasma. These media are frequently filtered for the purpose of sterilization by means of microporous membranes from the mentioned polymers, especially from those of polyamides, and can be contaminated by antioxidants located therein.

In a further special instance involving textile fibers based on polyamides a stabilization with antioxidants is out of the question because the tenside-containing washing liquors, detergent solutions customary when washing textiles would also result in an extraction of antioxidants, so that their effectiveness would be limited to the time of their first usage or a new treatment with antioxidant would be necessary after each washing procedure. The oxidation sensitivity of textile fibers of polyamides is especially noticeable due to a yellowing at high temperatures.

In the case of microporous membranes the oxidative degradation takes effect as a rapid decline in the mechanical strength. If, for example, non-oxidation-stabilized nylon membranes are autoclaved for 1 hour at 140° C. in the presence of atmospheric oxygen, the strength (measured as bursting strength) drops to nearly zero. On the other hand, membranes grafted in accordance with the invention suffer no measurable loss of strength in the sense of a decline of the bursting strength upon more than one hour being autoclaved under the named conditions. In distinction to membranes stabilized with antioxidants, this resistance to oxidative degradation remains even if the membrane is extracted prior to being autoclaved with a customary extracting agent for antioxidants such as e.g. ethanol.

Hydrolysis resistance

E.g. aliphatic and aromatic polyamide to exhibit a relatively high alkali resistance; however, the hydrolyris resistance of these polymers in the acidic range must be described as slight. The hydrolysis resistance of polyurethane is unsatisfactory both in the acidic and in the alkaline range for many applications. Polysulfonamides also exhibit a low hydrolysis resistance both in an acidic and in an alkaline milieu. The hydrolytic attack on the form bodies can take place both during their intended use when aqueous media with high or low pH'es and/or high temperatures can act on them or also during vapor sterilization or autoclaving.

The hydrolytic degradation of form bodies used in the medicinal or pharmaceutical field as well as in related fields is damaging not only on account of the already mentioned reduction of the mechanical strength. There is also a risk of contanination here that hydrolysis products of the polymers such as e.g. hexamethylene diamine and adipic acid can pass into the medium in the case of nylon 6.6 and also of oligomers.

The elevation of hydrolysis resistance by means of the use of the process of the invention is especially significant because other methods are not industrially available for the protection of the base polymers against hydrolytic degradation, corresponding to the antioxidants against oxidative degradation. Since the hydrolysis of form bodies attacks the surface, just as oxidation does, a very extensive protection can be achieved on the surface by grafting.

Radiation resistance

The same also applies to protection against the attack of ultraviolet radiation. Similar to the situation with the antioxidants, the using of the process of the invention renders the use of UV stabilizers superfluous.

The resistance to gamma radiation is of considerable industrial significance because radiation sterilization is widespread for form bodies used in the medical or pharmaceutical field. It is known that e.g. microporous membranes of polyamides are completely destroyed during radiation sterilization. The elevation of the resistance of not very compact form bodies with a high surface/mass ratio to gamma radiation is solved in accordance with the invention by means of an extensive matrix grafting. It is thus necessary in the case of resistance to gamma radiation, on account of the greater penetration depth of this radiation, to graft a greater amount of the base polymer than is necessary for the elevation of the chemical and UV resistance.

Mechanical properties

A significant alteration of the mechanical properties of form bodies in accordance with the process of the invention is limited by nature to that group which exhibits a high surface/mass ratio because otherwise an alteration of the mechanical surface properties relative to the bulk properties does not take effect.

Base polymers such as polyamides and polyurethanes are primarily used in industry on account of their special mechanical properties, of which in the first instance the mechanical strength and in the second instance the elasticity are especially exceptional. A basic alteration of the chemical nature of these polymers like that represented by the substitution of the hydrogen atom on the nitrogen has as its consequence a basic alteration of the intermolecular forces as the formation of hydrogen bridges between the polymer chains is prevented, as a result of which as a rule no improvement in the mechanical properties is to be expected.

However, it is surprisingly possible according to the invention to effect a considerable improvement of mechanical properties upon a purposeful selection of the monomers used for grafting. Thus, the grafting of hydroxyethylacrylate onto microporous membranes of nylon 6.6 and nylon 6 can eliminate the tendency of these materials toward brittleness in a completely dry state, thus e.g. after drying at 105° C. in a drying cupboard and a totally flexible material with unimpaired mechanical strength can be obtained. If, on the other hand, hydroxyethylmethacrylate is used instead of hydroxyethylacrylate, on the contrary, an embrittlement is more likely observed at the same degree of grafting.

Wettability, adsorption properties and zeta potential

The type of surface modification which can be attained is determined in an obvious manner primarily by means of the type of monomer used. Monomer mixtures can also be used if necessary if, as is explained in the description of the industrial embodiment of the process, special measures are taken which assure the reproducibility of the monomer composition over the entire production process.

According to a preferred embodiment of the invention the grafted-on monomers are cross-linked, preferably using bifunctional monomers, which cross-linking takes place with advantage simultaneously with the grafting. Unsaturated diesters of polyalcohols are mentioned as such bifunctional monomers.

However, it can be advantageous, depending on the intended use, to leave the grafted-on polymer non-cross-linked, in which case care should be taken that no bifunctional monomers are contained as impurities in the ethylenically unsaturated monomers to be grafted.

As regards the monomer concentration, grafting time and grafting temperature, it should be noted that if a high chain density given a small chain length is required, e.g. as concerns the influencing of wetting properties, adsorption properties and zeta potential, only low monomer concentrations and long grafting times should be used and the lowest possible degress of grafting and, correspondingly, the lowest possible reduction of flowthrough should be striven for. If it is a question of grafting an initial polymer for the subsequent fixing of ligands (e.g. natural and synthetic ligands for affinity chromatography), larger chain lengths with higher degrees of grafting are to be striven for but not necessarily a high chain density. In this instance a higher monomer concentration is selected and shorter grafting times are made to suffice.

Of the monomers indicated in the listing and suitable for the grafting process of the invention, among which monomers the methacrylic acid derivatives are generally preferred over otherwise comparable acrylic acid derivatives on account of their considerably higher hydrolysis stability, the acrylates and methacrylates of polyalcohols such as e.g. of ethylene glycol, glycerol, diethylene glycol, octaethylene glycol and of propylene glycol are suitable both for the hydrophilizing, that is, the raising of the wettability by water and also for the diminution of the protein adsorption. In addition, the named monomers are suitable for producing composite materials provided for the subsequent fixing of affinity ligands by means of reactions on the hydroxyl groups. Such a product is described in a parallel application (P 39 29 645.8-43). Hydroxyethylmethacrylate and glycerol methacrylate are especially preferred for this application.

The grafting of glycidyl methacrylate is preferred for the production of base materials for numerous further reactions which are also described in a parallel application (ion exchangers, chelate exchangers, etc.).

For the production of ion exchangers, preferably membrane ion exchangers, the direct grafting of the ionic monomers is also a possibility, in addition to the grafting of glycidylmethacrylate and the following introduction of ionic groups; however, the first-named path is more to be preferred than the latter. The strongly acidic, weakly acidic, strongly basic and weakly basic monomers cited in the list of monomers are suitable for these embodiments of the invention. If the already mentioned measures for obtaining a low degree of grafting with a high chain density are used instead of a high degree of grafting necessary for ion exchangers, the mentioned products can be obtained with modified zeta potential. In this connection, the requirement for a low degree of grafting is primarily significant in the case of microporous membranes in order to avoid an unnecessary reduction of flow-through.

Degree of grafting

The term "degree of grafting" denotes the increase in mass of the polymer when using the grafting process of the invention relative to the initial mass of the form body, expressed in % by weight. It is obviously understood that a relevant magnitude can only be present in the case of the non-compact form bodies because otherwise an increase in mass achievable by surface grafting in a thickness range of up to 0.1 μm can not constitute an expressive criterion.

On the other hand, in the case of non-compact form bodies, among which the microporous membranes constitute an extreme borderline case, the degree of grafting can vary within very broad limits according to the process of the invention, according to whether only pure surface properties, the adsorptive binding capacity or the bulk properties should be influenced. In the sequence indicated, the ranges of the degrees of grafting in question are approximately 1–5%, 5–45% and 10–700%, which ranges are to be understood only as quite rough reference points.

Tempering

For reasons which have not been physically completely explained at the present time, the grafting behavior of the base polymers is not only dependent on their chemical structure but also on their physical prehistory. This will be explained as follows using the example of polyamides.

Polyamides, for example, appear to occur in various modifications which differ in a conspicuous manner by virtue of their surface properties, especially their wetting behavior. If they are processed out of the melt, as is predominantly the case, they exhibit a high contact angle with water, even if it is still low in comparison to most of the other polymers. On the other hand, if they are precipitated out of solutions at low temperatures, as is the case e.g. in the production of membranes according to the method known as the "phase inversion process", the contact angle with water is so low that spontaneous wetting occurs in the case of microporosity. Such spontaneously wettable products are converted by a tempering procedure near the melting point of crystallite into the same state which is also present in the case of a direct processing from the melt, that is, they can then be wetted just as little as products prodsuced from the melt.

This phenomenon deserves to be mentioned in conjunction with the process of the invention in as far as the form bodies of nylon 6 and nylon 6.6 produced by precipitation from solutions at low temperatures, which applies e.g. to microporous membranes of this polymer, exhibit a lesser and poorly reproducible grafting tendency. A similarly favorable grafting behavior, both as concerns the grafting capacity as well as the reproducibility, can not be obtained, as is the case of products obtained directly from the melt, until after a tempering step which is carried out e.g. in superheated water vapor at temperatures between 220° and 240 ° C. The cited tempering step is therefore a preferred if not obligatory partial step when using the process of the invention on microporous membranes of polyamides produced according to the phase inversion process at low temperatures.

Technical execution of the process

The industrial execution of the process of the invention is explained in detail in the following for the case of areal web materials, especially microporous membranes, fleeces or tissues. The conclusions which results therefrom for the more compact formed bodies are not difficult for an expert to derive.

The grafting can take place in a batch operation or in a continuous manner. In order to achieve reproducible results over the entire web length, it is essential that identical conditions be maintained thereby, the consistency of which conditions is subject to various requirements in the course of time during the batch operation and the continuous process.

A device known in the textile industry under the designation "jigger" or a similar apparatus can be used for the batch operation. A jigger consists of two winding bobbins and a bath located between them. The web material is wound alternatingly on the two bobbins and drawn through the bath thereby. The entire device can be hermetically closed by a hood cover.

Since the winding speed can be selected to be very high, identical conditions are also given for the start and the end of the web when the bath changes its composition during the course of treatment. Although such a changing is not to be striven for, it can be better tolerated than if a continuous method is used.

This is especially significant if a mixture of monomers is grafted. As a consequence of the different copolymerizate parameters of the individual monomers, the grafting bath changes not only in the absolute concentration of monomers but also in their relationship to each other. Therefore, the grafting conditions vary in time during discontinuous grafting but in approximately the same manner over the entire web so that the reproducibility is assured.

The chlorination can either take place directly in the jigger or the web is introduced in a chlorinated state already. In any case, the exposure time of the chlorination solution must be maintained in accordance with the requirements. Thus, if a short chlorination time is intended to achieve a deep action of the grafting, then the exposure time of the chlorination bath from the immersion of the web until washing out must be taken into consideration, thus, in the case of a chlorination in the jigger also the dwell time in the state impregnated with the chlorination bath on the winding rollers.

A thorough soaking is to be performed after the chlorination because otherwise in the following grafting not only the reducing agent of the grafting bath would be consumed in an uncontrollable manner but the adhering chlorinating agent would also form a redox system initiating homopolymerization with the reducing agent.

If the chlorination was carried out in the jigger, it is ready after the soaking for the grafting and the gas chamber is washed with inert gas, for which nitrogen suggests itself, whereupon the grafting bath is filled in under the exclusion of atmospheric oxygen. The exclusion of atmospheric oxygen has the same reason as the washing after the chlorination, namely, the avoidance of the consumption of reducing agent and of homopolymerization.

The redox potential is preferably maintained constant in accordance with the viewpoints of the invention by dosing in the reducing-agent concentrate, which is preferably a 2% solution of Na dithionite, during the subsequent grafting, which takes place under a back-and-forth winding of the web through the grafting bath. The pH is likewise maintained constant by dosing lye in as far as it is not preferred to perform an appropriately strong buffering of the bath which would render this superfluous.

After the grafting time determined in pretests for the attainment of the desired effect, the remaining grafting bath is removed from the jigger, a soaking performed with ample supplying of fresh water and then a reduction is performed to remove the remaining chlorine content. The conditions necessary for dechlorination depend to a large extend on the degree of chlorination used and on the conditions of grafting and can be determined in pretests with the aid of iodometric chlorinating conditions. In the normal instance, the action of a 1% Na dithionite solution at pH 6 for 30 minutes is sufficient for dechlorination.

Both the bath method or the impregnation method are possible as continuous method. In the case of the bath method, the web is guided for the required grafting time once through the grafting bath and in the case of the impregnation method it is loaded with the impregnating solution and afterwards guided for the required grafting time through a dwell stretch constituting an inert gas chamber. A soaking bath takes place in both instances and then the dechlorination bath as above.

The uniformity over the web length presents certain difficulties in the first instance because the reproducibility is only given if the grafting conditions and therewith the composition of the grafting bath are maintained constant for the entire grafting time. Difficulties are posed thereby in particular by maintaining the monomer concentration constant whereas redox potential and pH, as already explained, pose few problems. The concentration of ethylenically unsaturated monomers can be determined via the UV adsorption with sufficient exactitude; however, this method is eliminated in the presence of Na dithionite because the reducing agent strongly absorbs in the same wavelength range. The density measurement is likewise unreliable because the density of the grafting bath varies by the necessary subsequent postaddition of electrolytes such as dithionite and lye.

Nevertheless, this process can be readily used in certain instances, to wit, when the monomer exhibits a limited water sobulility. It is possible in this instance, at least in the range of the saturation concentration, to maintain a constant monomer concentration even for long grafting times. To be sure, this is not strictly valid because a slow changing of the monomer solubility is brought about during the grafting time by the salt concentration, which necessarily increases due to the addition of lye and reducing agent. However, this influence can be disregarded in a first approximation.

In contrast thereto, the influence of the electrolyte concentration on the monomer solubility can also be utilized in a purposeful manner by purposefully reducing the solubility of monomers, even of water-muscible monomers such as e.g. hydroxyethylmethacrylate, by means of a high addition of salt so that grafting can be carried out in the saturation range with a constant concentration. However, this basically possible path is generally not preferred.

A few monomers which are especially suitable for the process of the invention such as e.g. glycidylmethacrylate, vinyl acetate and methylmethacrylate exhibit a water solubility which is within the range suitable for the use of the process. Thus, the water solubility of vinyl acetate is approximately 1.5%, that of glycidylmethacrylate approximately 2.5%. It is possible in these instances in a relatively easy manner to maintain the grafting bath continuously at the constant concentration corresponding to the saturation, e.g. in that it is saturated with the monomer in a circulating circuit by means of an absorption column. Another, even simpler method consists in that an emulsion of the monomer is used while employing a suitable emulsifier. The monomer represents the disperse phase in such an emulsion whereas the continuous aqueous phase forms the grafting medium. It is easy to recognize even visually in such a process from a decrease of the milky appearance whether the grafting medium has become depleted in monomer so that a subsequent dosing of the emulsion can take place in a timely manner. It is assured in any case that the monomer concentration in the grafting medium does not drop unnoticed below the saturation.

The above-named process of emulsion grafting does have significant advantages; however it can not be universally used in the sense of the invention because many of the preferred monomers are miscible with water. Moreover, it can also be advantageous to use a mixture of monomers. If the already described batch operation is not preferred in these instances, e.g. because a continuous operation is to be preferred for large production for economic reasons in every case, the alternative is impregnation grafting using the dwell stretch in inert gas.

It should be considered thereby that neither monomer concentration, redox portential or pH can be maintained constant in time. Inversely, however, the course of these variables in time can be maintained constant over the entire web length with high reproducibility and an extremely high degree of constancy of the product properties can be assured therewith, even if more than one monomer is used.

Due to its universal applicability, this process variant is especially preferred without this modifying of the utility of the other variants in special instances.

The following examples exemplify the invention.

EXAMPLES 1 TO 7

Examples 1 to 7 were carried out with non-reinforced microporous membranes with a nominal pore size of 0.2 $\mu$m and a hydraulic permeability of 20 ml/cm$^2$ min. bar (diameter of membrane specimens 50 mm).

EXAMPLE 1

Chlorination with aqueous sodium hypochlorite solution at various pH'es.

Commercially available chlorine bleaching liquour (containing sodium hypochlorite) was diluted to 1.2% active chlorine and adjusted to pH'es of 5, 6, 7 and 8. The membranes were treated therein between 5 and 400 sec. at room temperature, washed in tap water until no active chlorine could be demonstrated in the wash water and the chlorine content of the membranes determined iodometrically. The chlorine contents as a function of the treatment time are graphically shown (see FIG. 1).

It can be determined that the absorption of chlorine drops sharply with increasing pH but continuously increases with rising treatment time. It can also be determined that chlorinated filters are clearly damaged mechanically at pH 8 whereas no damage was able to be determined at low pH'es. Since the stability of hypochlorite solutions decreased due to the development of elementary chlorine at low pH'es, pH 6 was selected for further chlorination tests.

Figure 2:
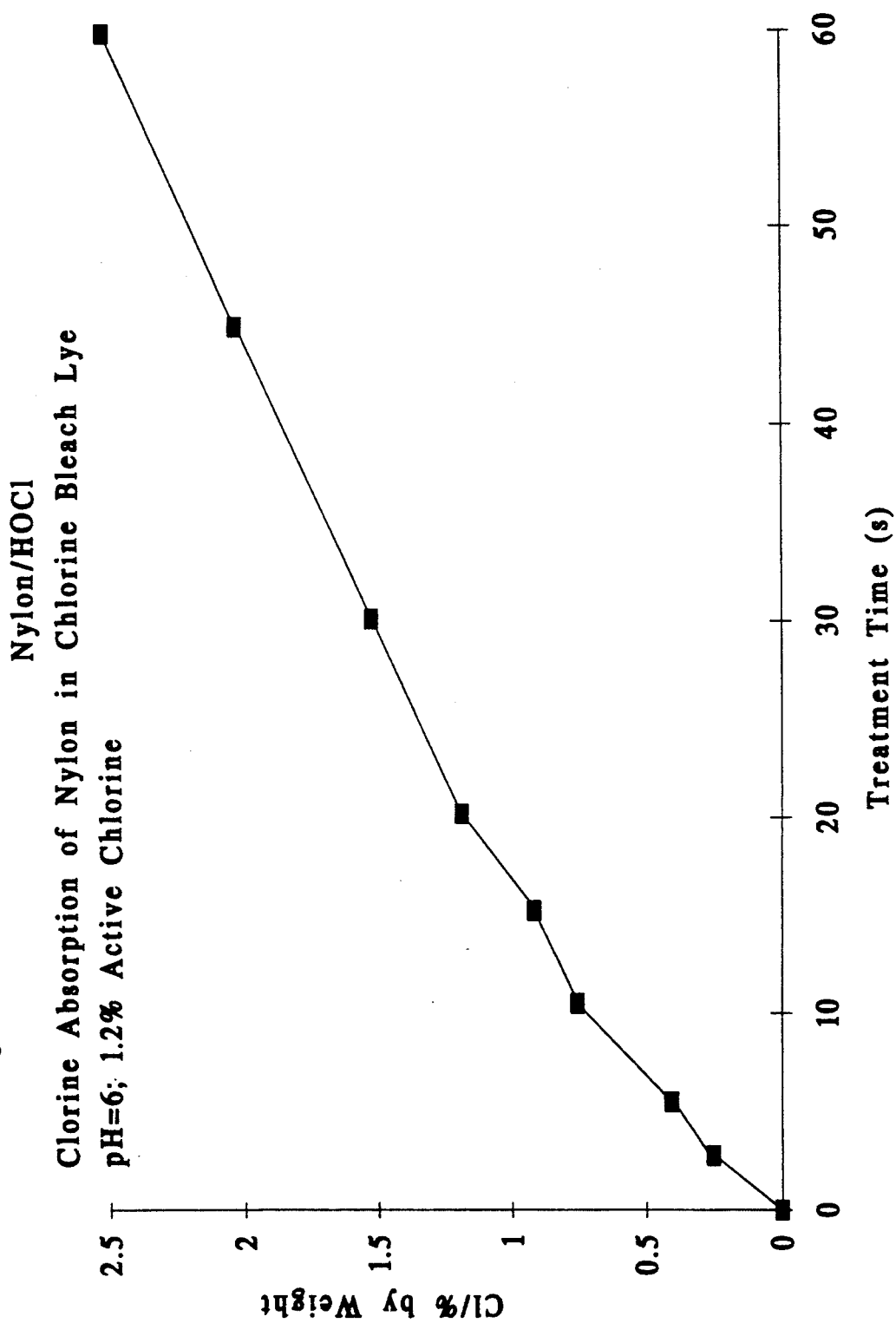
FIG. 2 is a graph showing treatment time in a nylon/HOCl bath.

The repetition of the test at pH 6 with reduced active chlorine content (0.12%) is shown in FIG. 2. These conditions were selected at a chlorination time of 5 sec. as standard conditions for the grafting tests after Na hypochlorite chlorination.

EXAMPLE 2

Chlorination with t-butylhypochlorite

Figure 3:
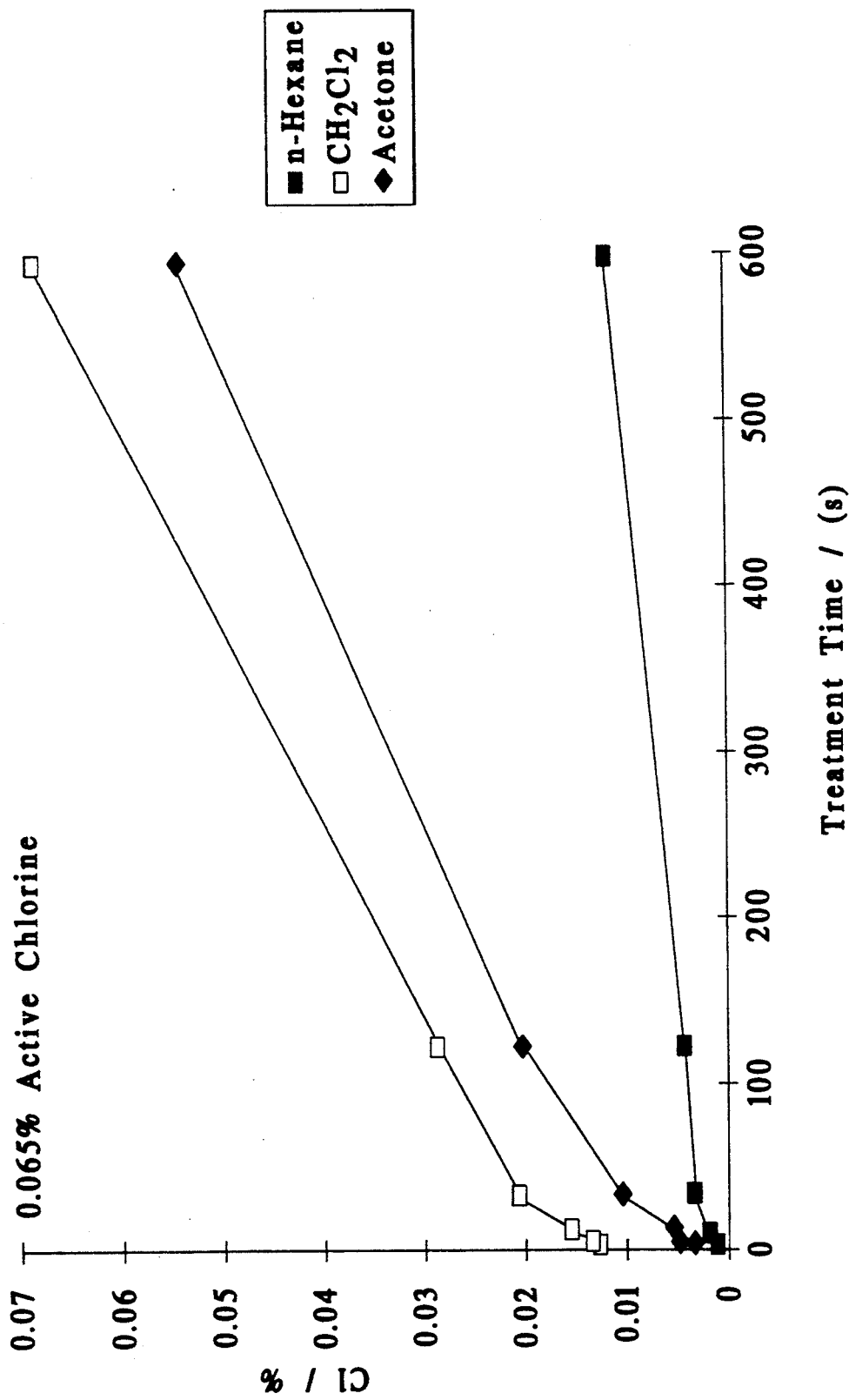
FIG. 3 is a graph showing treatment time for chlorine absorption wherein Butylhypochlorite is used.

The membranes were treated 0–800 sec. in a 0.1% solution of t-butylhypochlorite in n-hexyne, methylene chloride or acetone, washed with the particular pure solvent and the chlorine content determined according to a photometric method using Aquaquant Cl (Merck). The chlorine content as a function of the treatment time was graphically shown (see FIG. 3). It can be determined that the chlorine content continues to constantly rise, after a strong increase in the first seconds, with the treatment time and that there is a strong dependency on the solvent used. Although the active chlorine content of the solutions used is approximately 50% of that used in the second part of example 1, the chlorine absorption is below that of the reference example by at least a factor of 10.

It is assumed that the chlorine absorption, which is strong at first, can be traced to a chlorination of the surface which is followed by a chlorination of the matrix interior.

EXAMPLE 3

Chlorination with chloramine T

Figure 4:
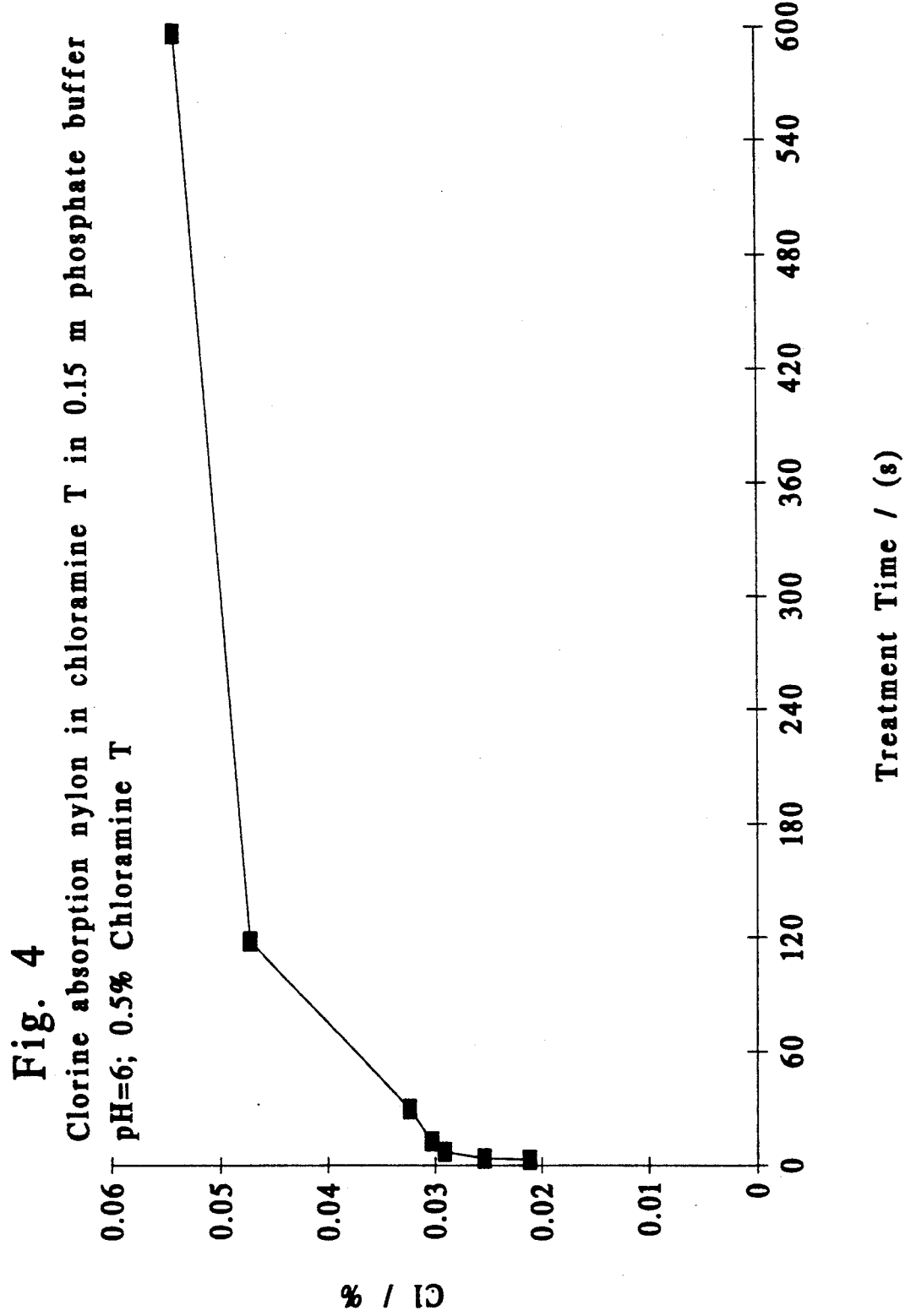
FIG. 4 is a graph depicting treatment time for chlorine absorption in chloramine in phosphate buffer.

The membranes were chlorinated at pH 6 for different times in a 0.5% aqueous solution of chloramine T (corresponding to an active chlorine content of 0.126%), washed and the chlorine content determined with Aquaquant Cl. Graph see FIG. 4.

The chlorine content exhibits a much sharper rise at short chlorination times than in the case of t-butylhypochlorite and remains largely constant after approximately 120 sec. It was determined in further tests (not shown), that practically the same final chlorine content is achieved at a chloramine T concentration of 10%.

This result is interpreted in such a manner that exclusively the surface is chlorinated with chloramine T. A slight further increase of the chlorine content is traced to slight amounts of inorganic hypochlorite which are in equilibrium with chloramine T.

EXAMPLE 4

Grafting of HEMA after chlorination with Na hypochlorite

Figure 5:
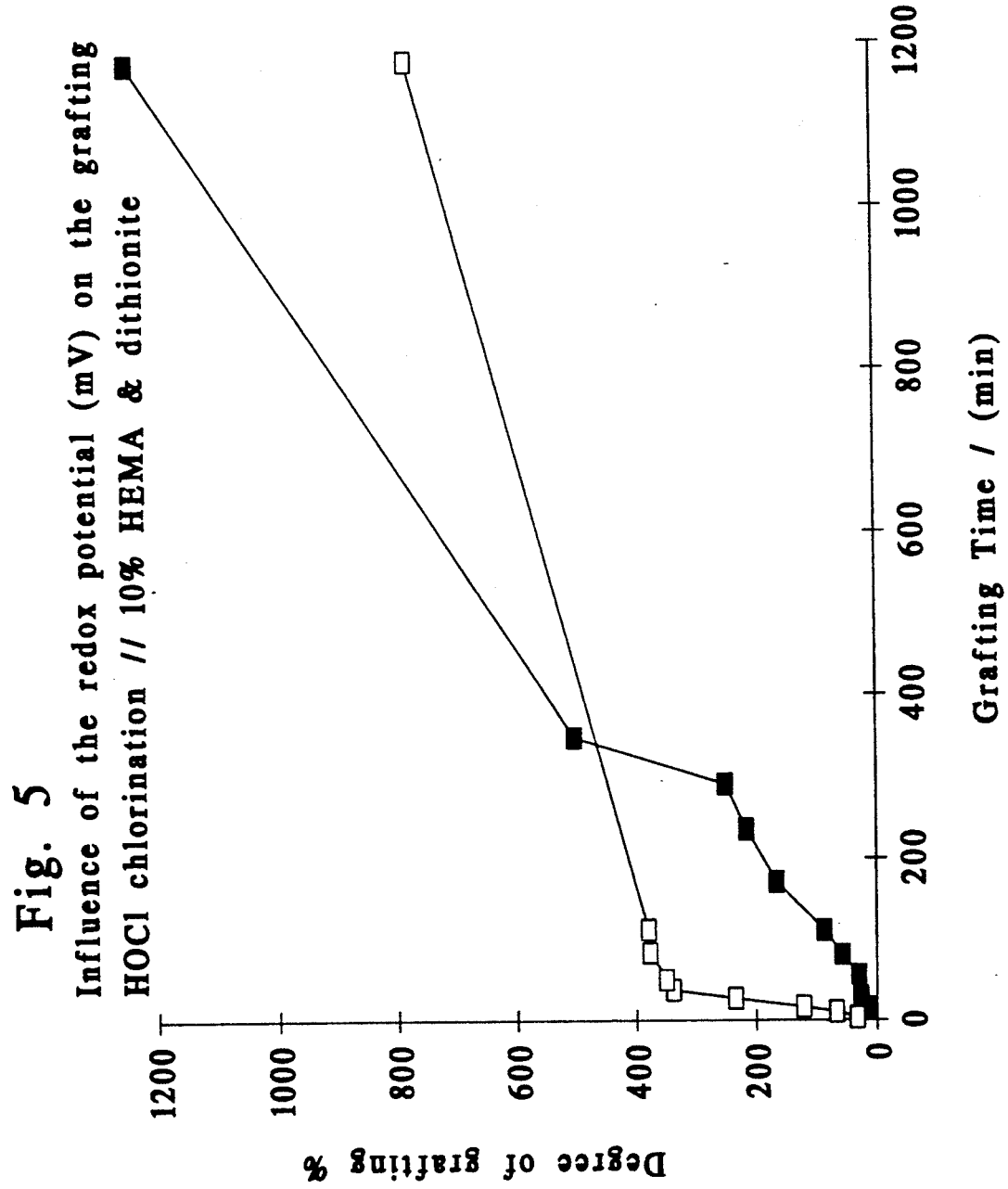
FIG. 5 is a graph depicting grafting extent.

The membranes were chlorinated under the standard conditions cited in example (corresponding to a chlorine content of 0.5%) and grafted for varying times in a 10% solution of hydroxyethylmethacrylate in 0.1M phosphate buffer pH 8 while dosing in Na dithionite solution for maintaining the redox potential constant. The redox potential was $-340$ and $-410$ mV. The course of graftinq is shown graphically in FIG. 5, in which the degree of grafting represents the weight increase in % of the initial weight.

A more rapid grafting takes place in the initial phase at higher redox potential, followed by a flattening. By way of contrast, the final degree of grafting after 20 h is higher at the lower redox potential.

Figure 6:
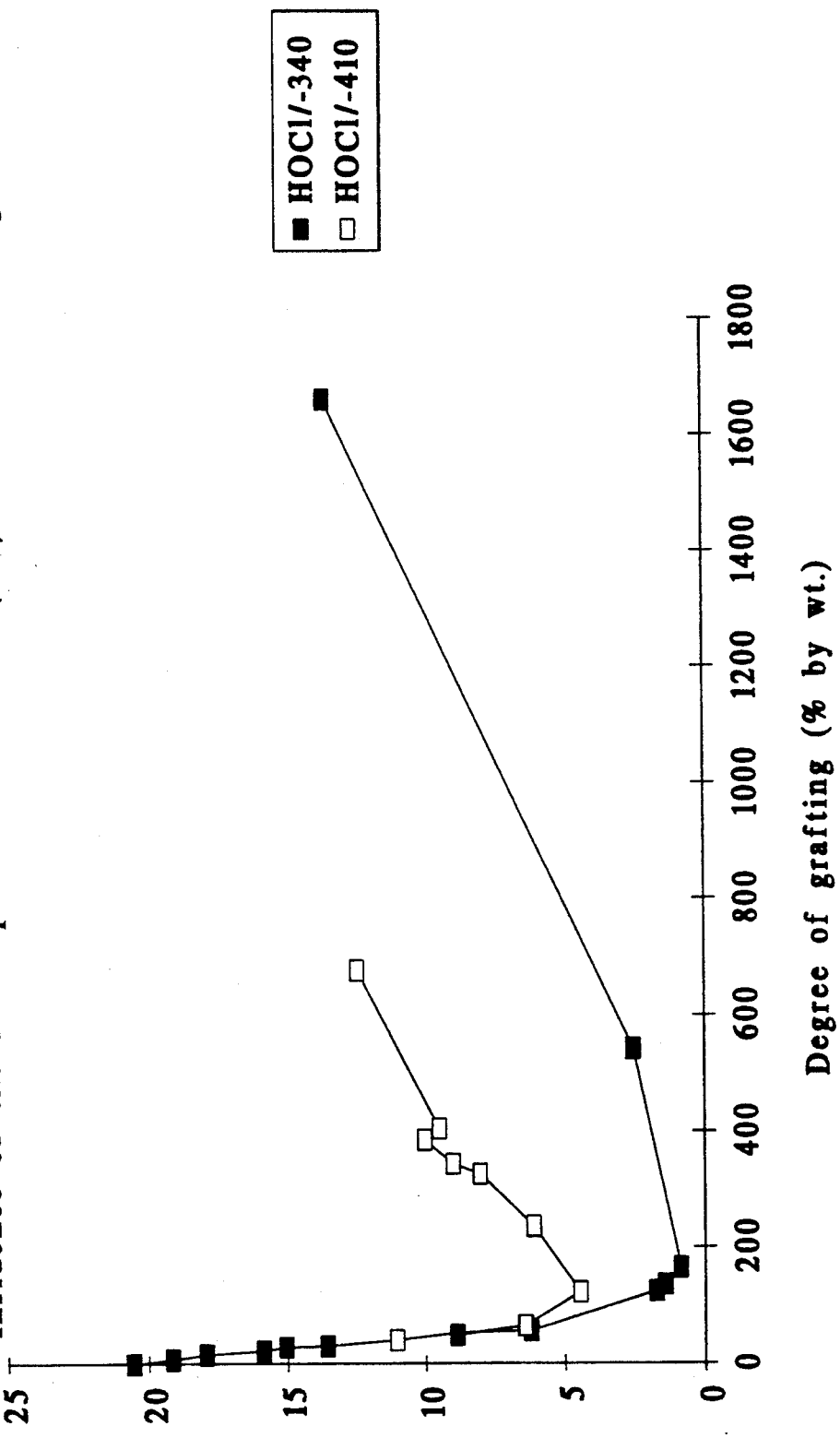
FIG. 6 is a graph depicting grafting extent in another bath.

FIG. 6 shows the flowthrough capacity of the grafted membranes in comparison to the degree of grafting. It turns out that at the same degree of grafting, the decrease in flowthrough is greater at a lower potential. An increase of the flowthrough capacity can be observed again in both instances at degrees of grafting above 100–150%.

EXAMPLE 5

Grafting of HEMA after chlorination with chloramine T

Figure 7:
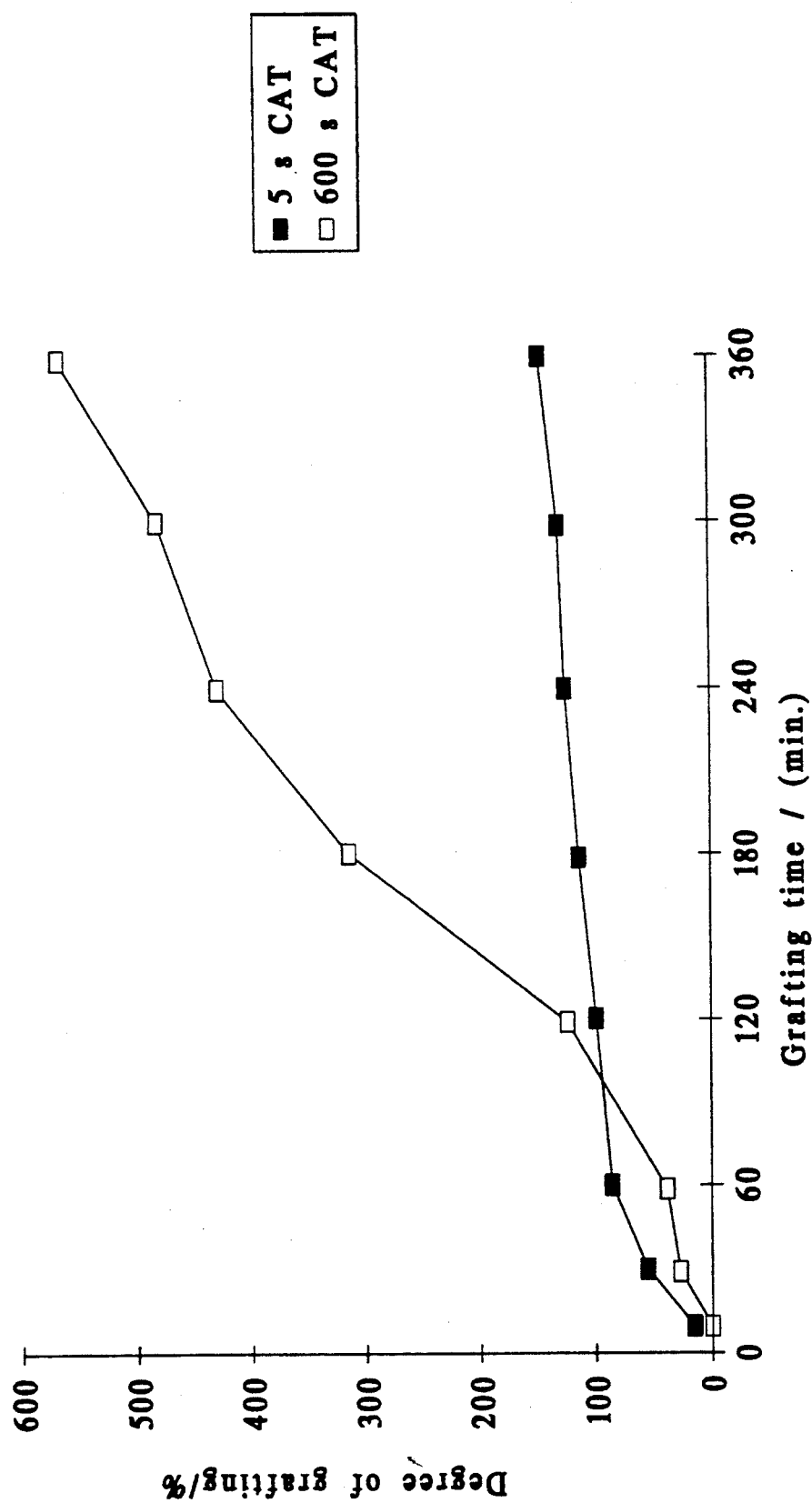
FIG. 7 is a graph depicting grafting extent in still another bath.

The membranes were chlorinated 5 and 600 sec. in a 0.5% aqueous solution of chloramine T at pH 6, corresponding to a chlorine content of 0.025 and 0.05%. The grafting took place as described in example 4. The degree of grafting as a function of the grafting time is shown in FIG. 7. In the initial phase the grafting took place more rapidly at the low chlorine content. After approximately 90 min. the same degree of grafting is achieved in both tests. However, whereas the grafting is now practically concluded in the case of a low chlorine content, presumably because the chlorine content is consumed, the degree of grafting continues to rise in the case of a high chlorine content.

Figure 8:
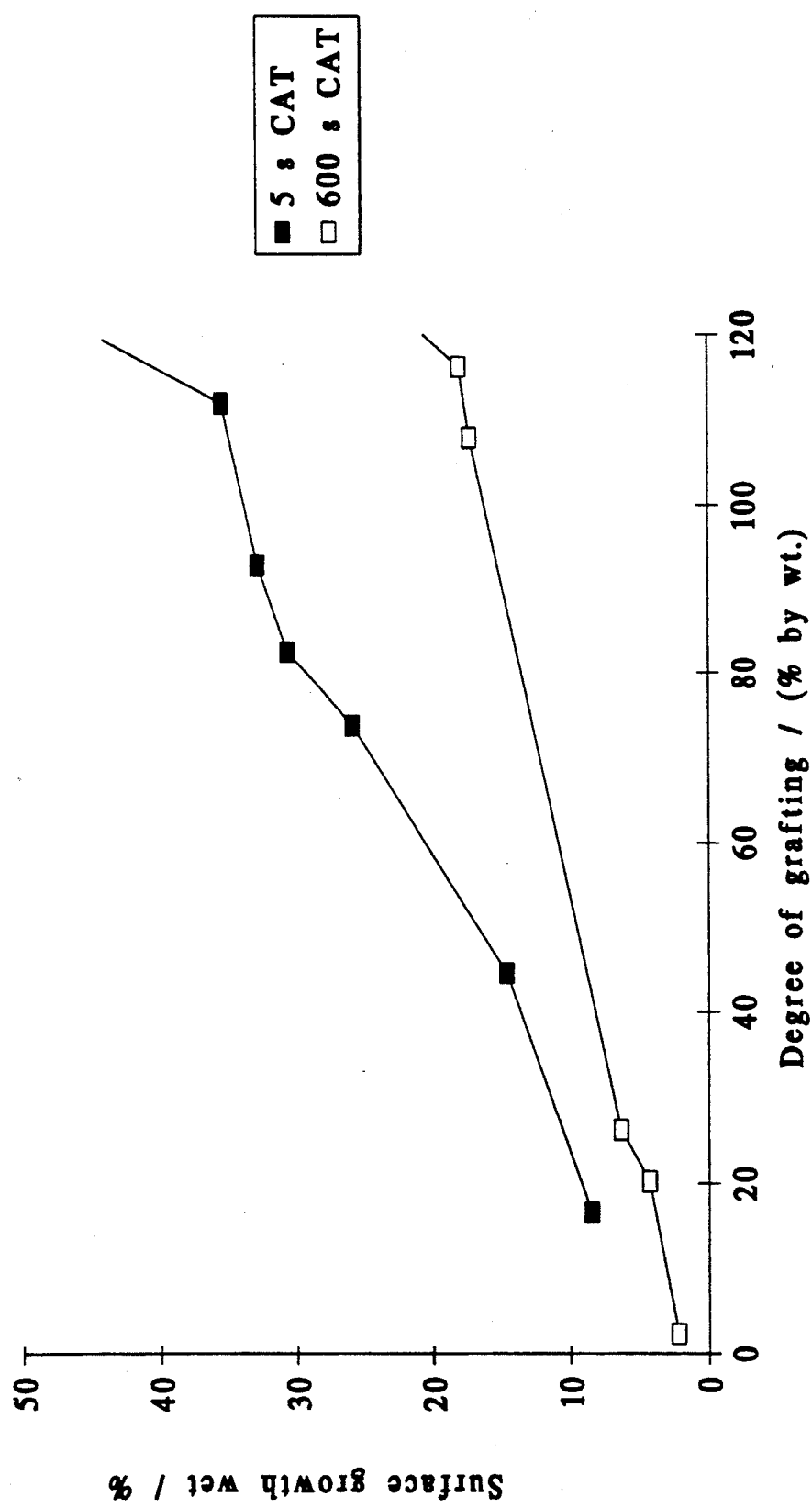
FIG. 8 is a graph depicting grafting extent in yet another bath.
Figure 9:
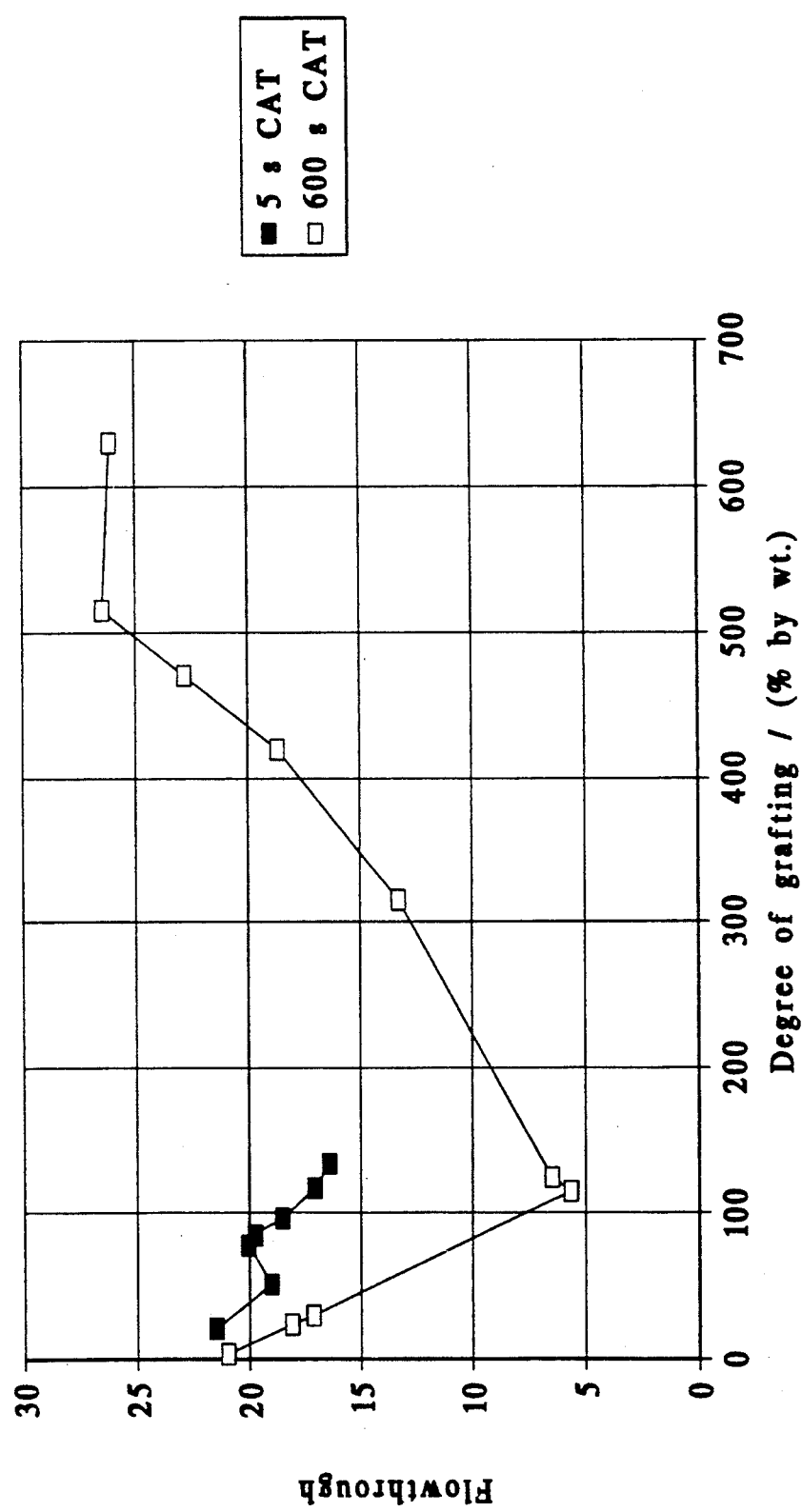
FIG. 9 is a graph depicting grafting degree in still yet another bath.

FIGS. 8 and 9 show the dependency of the surface growth and of the flowthrough rate on the degree of grafting. At the same degree of grafting, both the flowthrough rate and the surface growth for the lower-chlorinated specimens are above those of the highly chlorinated specimens. The latter thus preferably exhibit surface grafting.

EXAMPLE 6

Grafting of various monomers onto membranes chlorinated with Na hypochlorite according to the Ferongalite method.

Chlorination solution: Commercially available chlorine bleach liquor was diluted with RO water to 0.12% active chlorine and adjusted to pH 6 with dilute sulfuric acid.

Chlorination: the dry membranes were placed on the chlorination solution and immersed for 2 sec., removed again, washed with RO water, washed 15 min. in 1% solution of urea pH 10 and then washed 30 min. in RO water.

Grafting bath: Aqueous solution of 0.1% FeNa-EDTA ($Fe^{3+}$-EDTA complex), 0.1% EDTA, 1% rongalite, 2% Na carbonate, 10% monomer brought to pH 10 with 2N sulfuric acid.

Grafting: The chlorinated before filter was grafted 10 min. at room temperature under slight agitation, washed 10 min. with RO water, washed twice for 5 min. per time with acetone and dried 15 min. at 60° C. in a current of air.

| Monomer | Degree of grafting (%) after 10 min. | Degree of grafting (%) after 30 min. |
|---|---|---|
| Hydroxyethylmathacrylate | 7.6 | 17.7 |
| Methacrylamidoglycolate methylether | 2.3 | 3.8 |
| Glycerol methacrylate | 4.8 | 11.6 |
| Sulfopropylmethacrylate | 2.2 | 7.2 |
| N-morpholinopropyl-methacrylamide | 0.9 | 4.9 |
| Acrylic acid | 0.1 | 1.7 |
| Vinyl pyrrolidone | 2.6 | 7.1 |
| N-acrylamidoglycolic acid | 0.6 | 2.7 |
| Methacrylamide | 1.2 | 4.1 |
| 2-acrylamide-2-methyl-propanesulfonic acid | 1.1 | 3.2 |
| Methacrylamidopropyl-trimethylammonium chloride | 0.7 | 1.6 |

EXAMPLE 7

Grafting of various monomers on membranes chlorinated with Na-hydrochlorite according to the Na dithionite method without adjustment of potential Chlorination: Like example 6

Grafting bath: 0.1% Na dithionite in 0.15M phosphate buffer pH 8, 10% monomer, pH readjusted as required to 8.

Grafting: Like example 6

| Monomer | Degree of grafting (%) after 10 min. | Degree of grafting (%) after 30 min. |
|---|---|---|
| Diethyleneglycol-methacrylate | 30.1 | 70.3 |
| Hydroxypropylmethacrylate | 30.2 | 108.0 |
| Hydroxyethylmethacrylate | 54.3 | 155.0 |
| Methacrylamidoglycolate-methylether | 34.6 | 88.1 |
| Hydroxyethylacrylate | 36.5 | 63.3 |
| Hydroxypropylacrylate | 19.4 | 54.5 |
| Glycerol methacrylate | 28.1 | 57.5 |
| Acrylamide | 37.2 | 37.9 |
| Vinylacetate 12.9 (saturated solution) | 29.2 | |
| Octaethylene glycol methacrylate | 8.0 | 20.6 |
| Sulfopropylmethacrylate | 8.1 | 10.2 |
| N-morpholinopropyl-methacrylamide | 8.1 | 10.2 |
| Acrylic acid | 1.8 | 2.9 |
| Vinylpyrrolidone | 15.7 | 15.2 |
| Methacrylamide | 2.8 | 3.2 |
| 2-acrylamido-2-methyl-propanosulfonic acid | 3.0 | 4.0 |
| | 3.0 | 4.0 |
| Vinylimidazol | 3.2 | 3.1 |
| Methylvinylacetamide | 6.4 | 6.5 |

EXAMPLE 8

Continuous grafting of glycidylmethacrylate according to the emulsion method on a nylon 6 membrane web 40 cm wide, 30 m long (nominal pore size 0.45 μm) for further reactions to membrane ion exchangers and the like CAT solution: 2% solution of chloramine T adjusted with sulfuric acid to pH 6.3.

Monomer emulsion: 6 kg glycidylmethacrylate are mixed with 120 g emulsifier (Arlatone G, ICI) and emulsified with 113.8 kg 0.1M Na phosphate buffer pH 8 for 5 min. with a blade agitator.

CAT solution and monomer emulsion were filled into treatment pans with deflection rollers for the membrane web, at which time the monomer pan is sealed to the atmosphere and charged with nitrogen. Two further pans are located between the CAT pan and the monomer pan of which the first is filled with RO water which is replaced during the treatment with 100 l/h and the second with phosphate buffer pH 8. The monomer pan is followed by a further wash pan with RO water, then comes the winding. The drying took place in a separate step on a drying drum of 70° C.

The monomer emulsion is brought to a redox potential of −310 mV by dosing in a solution of 3% Na dithionite and 3% sodium hydroxide (pH 11–12) which potential is measured during the grafting potentiometrically and maintained constant by means of redosing the 3% dithionite solution. The dwell time in the CAT bath is 2 min. the dwell time in the monomer bath (grafting time) is adjusted via the web speed. Grafting time (min.) Degree of grafting (%)

| Grafting time (min.) | Degree of grafting (%) |
|---|---|
| 5.7 | 15 |
| 13 | 28.5 |

EXAMPLE 9

Like example 8 but instead of the nylon 6 membrane, a nylon 6.6 fleece with a surface weight of 30 g/m² is used. The degree of grafting is 7% at a grafting time of 15 min.

EXAMPLE 10

Examination of the oxidation resistance

Various membrane specimens with a nominal pore size of 0.2 μm were deposited in the gas chamber of an autoclave of the design customarily used for sterilization. The autoclave was heated to 142° C. but the air was not removed by blowing off vapor, as is otherwise customary. This assured the simultaneous action of water vapor and atmospheric oxygen at 142° C. After 1 h the membranes were removed and the bursting strength tested. The measurement of bursting strength took place in such a manner that the moistened filters were loaded without support on a diameter of 25 mm with an increasing gas pressure and the pressure at which the bursting of the membranes occurred was determined. All membrane specimens were non-reinforced. If a bursting strength was measurable, the treatment was multiply repeated. The result shows that the nylon membranes of the market contains an extractable antioxidant and that the grafted membrane exhibits the same oxidation resistance as the one stabilized with antioxidant.

| Specimen | Number of autoclavings | Bursting strength (bars) |
| --- | --- | --- |
| Nylon 6.6 non-grafted | 0 | 0.30 |
| Ultipor (Pall) | 0 | 0.24 |
|  | 2 | 0.25 |
|  | 4 | 0.26 |
| Ultipor (Pall), extracted overnight with ethanol | 0 | 0.24 |
|  | 1 | 0.0 |
| Nylon 6.6 grafted with hydroxyethyl-methacrylate (degree of grafting 14%) | 0 | 0.58 |
|  | 2 | 0.48 |
|  | 4 | 0.48 |
|  | 5 | 0.43 |

EXAMPLE 11

Examination of the γ radiation resistance

Various membrane specimens with a nominal pore size of 0.2 μm were exposed to a γ radiation dose of 2.5 Mrads and the bursting strength then determined as described in example 10.

| Specimen | Burstng strength (bars) before irradiation | after irradiation |
| --- | --- | --- |
| Nylon 6 membranes | 0.28 | 0.01 |
| Ultipor (Pall) without antioxidant | 0.22 | 0.015 |
| Ultipor (Pall) with antioxidant | 0.23 | 0.02 |
| Nylon 6 membrane according to example 5 grafted with hydroxyethylmethacrylate (degree of grafting 10%) | 0.29 | 0.06 |
| Nylon 6 mexbrane according to example 8 grafted with glycidylmethacrylate (degree of grafting 28%) | 0.33 | 0.23 |

This example shows that polyamide membranes can be obtained by using the grafting process of the invention which exhibit 70% of their original mechanical strength after the action of the radiation dosage customary in radiation sterilization.

EXAMPLE 12

Wettability of hydroxyethylmethacrylate-grafted membranes by liquids with a high surface tension.

The time was determined for nylon 6 membranes with a nominal pore size 0f 0.2 μm chlorinated according to example 5 after 600 sec. with chloramine T and grafted with hydroxyethylmethacrylate which time elapses between the placing of 10 μl water (γ=72 dyn/cm) or solution of common salt on the membrane surface and the complete adsorption of the liquid by the membrane (suction time). A 17% (γ=79 dyn/cm) and a saturated solution of common salt (26%, γ=82.6 dyn/cm) were used. The non-grafted membranes as well as commercial nylon 6.6 membranes were used for comparison. The commercial product "Loprodyne" is a product which is surface-modified to elevate the hydrophilia. The table indicataes the suction times in seconds.

| Specimen | Water | 17% NaCl | 26% NaCl |
| --- | --- | --- | --- |
| Non-grafted | 33 | >3600 | no wetting |
| Degree of grafting 10% | 15 | 200 | no wetting |
| Degree of grafting 20% | 17 | 85 | 300 |
| Ultipor 0.2μ (Pall) | 21 | >3600 | no wetting |
| Loprodyne 0.2μ (Pall) | 20 | 210 | no wetting |

The wettability necessary for a special application can be adjusted within broad limits in the grafting process of the invention and all hydrophilic monomers can be used thereby. It is not necessary thereby that the monomer comprises hydroxyl groups. The ionic monomers can also be considered as well as neutral ones such as e.g. vinyl pyrrolidone. Glycidylmethacrylate, which does not bring about any hydrophilizing itself, can also be grafted for hydrophilic modification and subsequently hydrolysed to glycerol methacrylate. The same applies to the grafting of vinyl acetate and the subsequent saponification to vinyl alcohol.

We claim:

1. A process comprising surface grafting of microporous polymers of nitrogen-containing polymers with ethylenically unsaturated monomers, by a process alternative to the application of high-energy radiation and/or the use of high temperatures, further by,
    a) removing hydrogen atoms on the nitrogen atoms of the polymer by halogen atoms using inorganic N-halogen derivatives as halogenizing agent,
    b) removing a part of the halogen by reducing agents in the presence of ethylenically unsaturated monomers during a radical grafting of the same on the nitrogen atoms and
    c) thereafter removing the remaining halogen atoms by reducing agents in the absence of monomers.

2. The process according to claim 1, wherein a chlorinating agent is used as halogenating agent.

3. The process according to claim 2, wherein an inorganic hypochlorite, preferably Na hypochlorite in aqueous solution is used as chlorinating agent.

4. The process according to claim 3, wherein the pH of the chlorinating agent is 5 to 7, preferably approximately 6.

5. The process according to any one of claims 3 and 4, wherein the active chlorine content of the chlorinating agent is 0.05 to 3%, preferably 0.1 to 0.5%.

6. The process according to any one of claims 3 to 5, wherein the chlorination is carried out at room temperature and the chlorination time for effecting a matrix grafting is 30 s. to 5 min., preferably 1 to 2 min.

7. The process according to any one of claims 5 to 6, wherein the chlorination is carried out at room temperature and the chlorination time for effecting a pure surface grafting is 5 to 15 min., preferably approximately 10 min.

8. The process according to claim 2, wherein an organic hypochlorite, preferably t-butylhypochlorite, dissolved in an inert organic solvent is used as chlorinating agent.

9. The process according to claim 8, wherein n-hexane, methylene chloride or acetone is used as organic solvent.

10. The process according to claim 2, wherein the sodium salt of N-chloro-p-toluene sulfonamide with a formula weight of 230 and a hydrolysis constant of approximately $10^{-8}$ is used as chlorinating agent.

11. The process according to any one of claims 10 and 14, wherein the concentration of the chlorination of the chlorinating agent is 0.1 to 3%, preferably 1 to 2%.

12. The process according to any one of claims 10 to 11, wherein chlorination times of 2 to 10 s. are used for achieving a matrix grafting.

13. The process according to any one of claims 10 to 11, wherein chlorination times of 0.5 to 10 min., preferably of 1 to 5 min. are used for achieving a pure surface grafting.

14. The process according to claim 2, wherein the pH of the chlorinating agent is between 5 and 7, preferably approximately 6.3.

15. The process according to claim 2, wherein dichloroisocyanuric acid is used as chlorinating agent.

16. The process according to claim 1, wherein an inorganic hypobromite is used as halogenizing agent.

17. The process according to claim 16, wherein the inorganic hypobromite is produced in situ by exposing the polymer to be brominated successively to an atmosphere of bromine and one of ammonia.

18. The process according to any one of claims 1 to 17, wherein mono unsaturated monomers are used as ethylenically unsaturated monomers.

19. The process according to claim 18, wherein acrylic acid, methacrylic acid and its esters or amides are used as ethylenically unsaturated monomers.

20. The process according to claim 18, wherein mono ethylenically unsaturated monomers containing hydroxy groups are used.

21. The process according to claim 20, wherein the ethylenically unsaturated monomer is selected from the group consisting of:
Hydroxyethylmethacrylate
Methacrylamidoglycolate methylether
Glycerol methacrylate
Sulfopropylmethacrylate
N-morpholinopropylmethacrylamide
Acrylic acid
Vinyl pyrrolidone
N-acrylamidoglycolic acid
Methacrylamide
2-acrylamide-2-methyl-propanesulfonic acid
Methacrylamidopropyltrimethylammonium chloride
Diethyleneglycolmethacrylate
Hydroxypropylmethacrylate
Methacrylamidoglycolate methylether
Hydroxyethylacrylate
Hydroxypropylacrylate
Acrylamide
Vinylacetate
Octaethylene glycol methacrylate
Vinylimidazol
Methylvinylacetamide and
Glycidylmethacrylate.

22. The process according to any one of claims 1 to 17, wherein polyunsaturated monomers are used as ethylenically unsaturated monomers.

23. The process according to claim 22, wherein the polyunsaturated monomer is selected from the group consisting of pentaerythrite dimethacrylate, glycerol dimethacrylate, tetraethylene glycol dimethacrylate and tetraethylene glycol diacrylate.

24. The process according to any one of claims 1 to 23, wherein mixtures of monomers are used.

25. The process according to any one of claims 1 to 24, wherein the grafted, ethylenically unsaturated monomers are cross-linked.

26. The process according to claim 25, wherein the cross-linking is carried out using bifunctional monomers simultaneously with the grafting.

27. The process according to any one of claims 1 to 26, wherein the monomers are added to the grafting solution in the form of an emulsion.

28. The process according to any one of claims 1 to 27, wherein the reducing agent is selected from the group consisting of sodium dithionite, rongalite, hydrazine and ascorbic acid to remove the halogen atoms during the grafting.

29. The process according to claim 28, wherein ascorbic acid is used in the alkalinge range.

30. The process according to claim 28, wherein rongalite is used at temperatures above 40° C.

31. The process according to claim 28, wherein rongalite is used in combination with EDTA-complexed $Fe^{2+}$ at a pH of approximately 10.

32. The process according to claim 28, wherein sodium dithionite is used as reducing agent at a pH of 6 to 10 preferably 7.5 to 8 and in a concentration of 0.02 to 1%.

33. The process according to claim 32, wherein sodium dithionite is used at a redox potential of $-100$ to $-700$ mV, preferably between $-100$ and $-500$ mV.

34. The process according to claim 33, wherein the redox potential is potentiometrically determined during the grafting and maintained constant by dosing in a sodium dithionite concentrate.

35. The process according to any one of claims 1 to 34, wherein the nitrogen-containing polymer is selected from the group consisting of aliphatic polyamides, polyurethanes, polysulfonamides and of polymers which do not have the nitrogen in the main chain but in the side chain.

36. The process according to claim 35, wherein the polymer is in the form of foils or capillaries.

37. The process according to claim 35, wherein the polymer is in the form of fibers having a thickness range of 1 to 100 μm and a surface/mass ratio of 0.4 to 4 m²/g.

38. The process according to claim 35, wherein the polymer is in the shape of fibers or of tissues or fleeces produced therefrom.

39. The process according to claim 35, wherein the polymer is in the shape of a membrane.

40. The process according to any one of claims 1 to 39, wherein areal web materials are used for grafting.

41. The process according to claim 40, wherein the process is carried out in a discontinuous manner on a jigger.

42. The process according to claim 40, wherein the process is carried out in a continuous manner in a grafting bath.

43. The process according to claim 42, wherein the monomer concentration is maintained constant by using a monomer of limited water solubility and by maintaining the saturation concentration.

44. The process according to claim 43, wherein the saturation concentration of the monomer is reduced by means of the addition of electrolytes.

45. The process according to claim 40, wherein a web is impregnated with the grafting solution and that the grafting is carried out in a continuous manner in a dwell time under inert gas.

* * * * *